US011909983B2

(12) United States Patent
Hannuksela et al.

(10) Patent No.: US 11,909,983 B2
(45) Date of Patent: Feb. 20, 2024

(54) APPARATUS, A METHOD AND A COMPUTER PROGRAM FOR VIDEO CODING AND DECODING

(71) Applicant: Nokia Technologies Oy, Espoo (FI)

(72) Inventors: Miska Hannuksela, Tampere (FI); Igor Curcio, Tampere (FI); Sujeet Shyamsundar Mate, Tampere (FI); Emre Aksu, Tampere (FI); Ari Hourunranta, Tampere (FI)

(73) Assignee: Nokia Technologies Oy, Espoo (FI)

( * ) Notice: Subject to any disclaimer, the term of this patent is extended or adjusted under 35 U.S.C. 154(b) by 214 days.

(21) Appl. No.: 17/433,034

(22) PCT Filed: Feb. 19, 2020

(86) PCT No.: PCT/FI2020/050104
§ 371 (c)(1),
(2) Date: Aug. 23, 2021

(87) PCT Pub. No.: WO2020/183055
PCT Pub. Date: Sep. 17, 2020

(65) Prior Publication Data
US 2022/0159267 A1    May 19, 2022

(30) Foreign Application Priority Data

Mar. 14, 2019    (FI) ..................... 20195187

(51) Int. Cl.
*H04N 19/105*    (2014.01)
*H04N 19/159*    (2014.01)
(Continued)

(52) U.S. Cl.
CPC ......... *H04N 19/146* (2014.11); *H04N 19/105* (2014.11); *H04N 19/159* (2014.11); *H04N 19/172* (2014.11)

(58) Field of Classification Search
CPC .. H04N 19/146; H04N 19/105; H04N 19/159; H04N 19/172
See application file for complete search history.

(56) References Cited

U.S. PATENT DOCUMENTS 9,786,322 B2 *  10/2017  Van Stam .......... G06F 11/1417
2008/0267287 A1  10/2008  Hannuksela
(Continued)

FOREIGN PATENT DOCUMENTS

JP    2018-533281 A    11/2018
WO    2016/093752 A1    6/2016
(Continued)

OTHER PUBLICATIONS

Wang et al., "WD 3 of ISO/IEC 23090-2 OMAF 2nd edition", ISO/IEC JTC1/SC29/WG11 N17963-v1, Systems, Oct. 2018, 235 pages.
(Continued)

*Primary Examiner* — Kyle M Lotfi
(74) *Attorney, Agent, or Firm* — Harrington & Smith

(57) ABSTRACT

A method comprising: encoding video media content into at least a first representation and a second representation, wherein the first representation comprises a switchable inter-coded picture, wherein the switchable picture has a first characteristic that no pictures preceding the switchable picture in decoding order are used as reference pictures for any non-switchable pictures following the switchable picture in decoding order; and the second representation comprises one or more decoder reset pictures aligned with the switchable pictures of the first representation, wherein the frame rate of the second representation is smaller than or equal to the frame rate of the first representation and the resolutions of the first and the second representation are equal.

19 Claims, 10 Drawing Sheets

(51) Int. Cl.
H04N 19/172 (2014.01)
H04N 19/146 (2014.01)

(56) References Cited

U.S. PATENT DOCUMENTS

| | | | |
|---|---|---|---|
| 2015/0245075 A1 | 8/2015 | Lee et al. | |
| 2015/0373342 A1* | 12/2015 | Hendry | H04N 19/70 375/240.02 |
| 2016/0219306 A1 | 7/2016 | Pettersson et al. | |
| 2016/0234536 A1 | 8/2016 | Stockhammer et al. | |
| 2016/0301895 A1 | 10/2016 | Lu et al. | |
| 2017/0347084 A1* | 11/2017 | Boyce | H04N 19/33 |
| 2018/0164593 A1 | 6/2018 | Van Der Auwera et al. | |
| 2018/0213300 A1 | 7/2018 | Chen et al. | |

FOREIGN PATENT DOCUMENTS

| | | |
|---|---|---|
| WO | 2017/053351 A1 | 3/2017 |
| WO | 2017/093611 A1 | 6/2017 |
| WO | 2018/178507 A1 | 10/2018 |

OTHER PUBLICATIONS

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222, Mar. 2017, 291 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 15: Advanced Video Coding (AVC) File Format", ISO/IEC 14496-15, First edition, Apr. 15, 2004, 29 pages.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audio-visual services—Coding of moving Video, Recommendation ITU-T H.264, Apr. 2017, 812 pages.

"Information Technology—Coding of Audio-Visual Objects—Part 10: Advanced Video Coding", ISO/IEC 14496-10, Second edition, Oct. 1, 2004, 280 pages.

"High Efficiency Video Coding", Series H: Audiovisual And Multimedia Systems, Infrastructure of audiovisual services—Coding of moving video, Recommendation ITU-T H.265, Feb. 2018, 692 pages.

"3rd Generation Partnership Project; Technical Specification Group Services and System Aspects; Transparent end-to-end Packet-switched Streaming Service (PSS); Protocols and codecs (Release 15)", 3GPP TS 26.234, V15.1.0, Sep. 2018, pp. 1-174.

"Information Technology—Dynamic Adaptive Streaming over HTTP (DASH)—Part 1: Media Presentation Description and Segment Formats", ISO/IEC 23009-1, Second Edition, May 15, 2014, 152 pages.

"3rd Generation Partnership Project; Technical Specification Group Services and System Aspects; Transparent end-to-end Packet-switched Streaming Service (PSS); Progressive Download and Dynamic Adaptive Streaming over Http (3GP-DASH) (Release 16)", 3GPP TS 26.247, V16.1.0, Dec. 2018, pp. 1-138.

Pantos et al., "HTTP Live Streaming", RFC 8216, Independent Submission, Aug. 2017, pp. 1-60.

"Information technology—Coded representation of immersive media (MPEG-I)—Part 2: Omnidirectional media format", ISO/IEC JTC 1/SC 29/WG 11, ISO/IEC FDIS 23090-2:201x (E), Apr. 26, 2018, 182 pages.

"Versatile Video Coding", Series H: Audiovisual and Multimedia Systems Infrastructure of audiovisual services—Coding of moving video, Recommendation ITU-T H.266, Aug. 2020, 516 pages.

Office action received for corresponding Finnish Patent Application No. 20195187, dated Oct. 14, 2019, 11 pages.

International Search Report and Written Opinion received for corresponding Patent Cooperation Treaty Application No. PCT/FI2020/050104, dated May 19, 2020, 16 pages.

Extended European Search Report received for corresponding European Patent Application No. 20770834.8, dated Nov. 16, 2022, 7 pages.

Office action received for corresponding Chinese Patent Application No. 202080020905.9, dated Feb. 25, 2023, 11 pages of office action and no page of translation available.

Office Action received for corresponding Japanese Patent Application No. 2021-555286, dated Sep. 12, 2022, 4 pages of Office Action and 5 pages of summary available.

Hannuksela et al. "Use cases and proposed design choices for adaptive resolution changing (ARC)", Joint Video Experts Team (JVET) of ITU-T SG 16 WP 3 and ISO/IEC JTC 1/SC 29/WG 11, JVET-M0259, 13th Meeting, Jan. 9-18, 2019, pp. 1-10.

Hannuksela, "AHG12/AHG17: On merging of MCTSs for viewport-dependent streaming", Joint Video Experts Team (JVET) of ITU-T SG 16 WP 3 and ISO/IEC JTC 1/SC 29/WG 11, JVET-M0388, 13th Meeting, Jan. 9-18, 2019, pp. 1-5.

* cited by examiner

```
┌─────────────────────────────────────────────────────────────────────────┐
│   Receive at least one bitstream corresponding to a first representation of encoded │
│      video media content, the first representation comprising one or more switchable │
│   inter-coded pictures, wherein the switchable picture has a first characteristic that no │
│     pictures preceding the switchable picture in decoding order are used as reference │
│            pictures for any non-switchable pictures following the switchable picture │
│                                  in decoding order (1300)                │
└─────────────────────────────────────────────────────────────────────────┘
                                      │
                                      ▼
┌─────────────────────────────────────────────────────────────────────────┐
│   Receive, from or along the at least one bitstream, an indication about suitability of │
│    switching between the first representation and a second representation in decoding, │
│      wherein the second representation comprises one or more decoder reset pictures │
│    aligned with the switchable inter-coded pictures of the first representation, wherein │
│    the frame rate of the second representation is equal or smaller than the frame rate │
│                  of the first representation and the resolutions of the first and │
│                        the second representation are equal (1302)        │
└─────────────────────────────────────────────────────────────────────────┘
                                      │
                                      ▼
┌─────────────────────────────────────────────────────────────────────────┐
│        Receive at least one decoder reset picture of the second representation (1304) │
└─────────────────────────────────────────────────────────────────────────┘
                                      │
                                      ▼
┌─────────────────────────────────────────────────────────────────────────┐
│         Decode at least one decoder reset picture of the second representation │
│                  followed by picturtes of the first representation (1306) │
└─────────────────────────────────────────────────────────────────────────┘
```

Fig. 13

APPARATUS, A METHOD AND A COMPUTER PROGRAM FOR VIDEO CODING AND DECODING

RELATED APPLICATION

This application claims priority to PCT Application No. PCT/FI2020/050104, filed on Feb. 19, 2020, which claims priority to Finnish Application No. 20195187, filed on Mar. 14, 2019, each of which is incorporated herein by reference in its entirety.

TECHNICAL FIELD

The present invention relates to an apparatus, a method and a computer program for video coding and decoding.

BACKGROUND

Recently, the development of various multimedia streaming applications, especially 360-degree video or virtual reality (VR) applications, has advanced with big steps. In viewport-adaptive streaming, the bitrate is aimed to be reduced e.g. such that the primary viewport (i.e., the current viewing orientation) is transmitted at the best quality/resolution, while the remaining of 360-degree video is transmitted at a lower quality/resolution. When the viewing orientation changes, e.g. when the user turns his/her head when viewing the content with a head-mounted display (HMD), another version of the content needs to be streamed, matching the new viewing orientation.

During a streaming session, the user may pause the playback at any time. When the playback is paused, the user may look around and go outside the viewport after he/she paused the playback. In such a case, the out-of-viewport regions will be in lower quality/resolution. This phenomenon considerably degrades the user experience. Although there is enough bandwidth and time to display all 360-degree sphere in high quality while in pause state, there is no signaling mechanism to efficiently retrieve/decode/playback the current 360-degree sphere frame instance. Moreover, a complete 360-degree picture in high resolution might exceed the decoding capability.

SUMMARY

Now in order to at least alleviate the above problems, an enhanced method for content retrieval during playback pause of a decoder is introduced herein.

A method according to a first aspect comprises encoding video media content into at least a first representation and a second representation, wherein the first representation comprises a switchable inter-coded picture, wherein the switchable picture has a first characteristic that no pictures preceding the switchable picture in decoding order are used as reference pictures for any non-switchable pictures following the switchable picture in decoding order; and the second representation comprises one or more decoder reset pictures aligned with the switchable pictures of the first representation, wherein the frame rate of the second representation is smaller than or equal to the frame rate of the first representation and the resolutions of the first and the second representation are equal.

An apparatus according to a second aspect comprises means for encoding video media content into at least a first representation and a second representation, wherein the first representation comprises a switchable inter-coded picture, wherein the switchable picture has a first characteristic that no pictures preceding the switchable picture in decoding order are used as reference pictures for any non-switchable pictures following the switchable picture in decoding order; and the second representation comprises one or more decoder reset pictures aligned with the switchable pictures of the first representation, wherein the frame rate of the second representation is smaller than or equal to the frame rate of the first representation and the resolutions of the first and the second representation are equal.

According to an embodiment, the switchable picture has a second characteristic that the switchable picture is predicted only from zero or more previous switchable inter-coded pictures and/or from a previous random access picture in decoding order.

According to an embodiment, the apparatus further comprises means for indicating, in or along the bitstream comprising the representations, suitability of content of the representations for the switching between the representations in decoding.

According to an embodiment, the apparatus further comprises means for coding the switchable inter-coded pictures periodically.

According to an embodiment, the decoder reset picture is configured to be encoded as a Broken Link Access (BLA) picture type having no leading pictures following the BLA picture or as an Independent Decoding Refresh (IDR) picture.

A method according to a third aspect comprises receiving at least one bitstream corresponding to a first representation of encoded video media content, the first representation comprising a switchable inter-coded picture, wherein the switchable picture has a first characteristic that no pictures preceding the switchable picture in decoding order are used as reference pictures for any non-switchable pictures following the switchable picture in decoding order; receiving, from or along the at least one bitstream, an indication about suitability of switching between the first representation and a second representation in decoding, wherein the second representation comprises one or more decoder reset pictures aligned with the switchable inter-coded pictures of the first representation, wherein the frame rate of the second representation is equal or smaller than the frame rate of the first representation and the resolutions of the first and the second representation are equal; receiving at least one decoder reset picture of the second representation; and decoding the at least one decoder reset picture of the second representation followed by pictures of the first representation.

An apparatus according to a fourth aspect comprises means for receiving at least one bitstream corresponding to a first representation of encoded video media content, the first representation comprising a switchable inter-coded picture, wherein the switchable picture has a first characteristic that no pictures preceding the switchable picture in decoding order are used as reference pictures for any non-switchable pictures following the switchable picture in decoding order; means for receiving, from or along the at least one bitstream, an indication about suitability of switching between the first representation and a second representation in decoding, wherein the second representation comprises one or more decoder reset pictures aligned with the switchable inter-coded pictures of the first representation, wherein the frame rate of the second representation is equal or smaller than the frame rate of the first representation and the resolutions of the first and the second representation are equal; means for receiving at least one decoder reset picture of the second representation; and means for decoding at least one decoder reset picture of the second representation followed by pictures of the first representation.

According to an embodiment, the apparatus further comprises means for requesting, in response to a pause in a playback of the decoded first representation, the at least one decoder reset picture of the second representation.

According to an embodiment, the apparatus further comprises means for requesting, in response to a viewport switch, the at least one decoder reset of the second representation.

According to an embodiment, the viewport switch takes place from a first viewport to a second viewport, and wherein the first representation covers the first viewport, the apparatus further comprising means for receiving a second bitstream corresponding to a third representation of encoded video media content, the third representation representing the second viewport.

According to an embodiment, the apparatus further comprises means for requesting, in response to a viewpoint switch, the at least one decoder reset of the second representation.

According to an embodiment, the viewpoint switch takes place from a first viewpoint to a second viewpoint, and wherein the first representation covers the first viewpoint, the apparatus further comprising means for receiving a second bitstream corresponding to a third representation of encoded video media content, the third representation representing the second viewpoint.

According to an embodiment, the apparatus further comprises means for decoding, in response to a re-start of the playback, a decoder reset picture substantially timely corresponding to the re-start; and means for switching to decode pictures of the first representation following, in decoding order, a switchable inter-coded picture of the first representation, which is temporarily aligned with the decoder reset picture substantially timely corresponding to the re-start.

According to an embodiment, the apparatus further comprises means for requesting, in response to a pause in a playback of the decoded first representation, a plurality of decoder reset pictures of the second representation according to constraints of decoder buffer size and/or available bandwidth.

According to an embodiment, the apparatus further comprises means for requesting at least one decoder reset picture of the second representation for carrying out bitrate adaptation between the first representation and a third representation.

According to an embodiment, the bitrate switch takes place from a first bitrate to a second bitrate, and wherein the first representation covers the first bitrate, the apparatus further comprising means for receiving a second bitstream corresponding to the third representation of encoded video media content, the third representation representing the second bitrate.

According to an embodiment, the apparatus further comprising means for extracting the at least one switchable inter-coded picture from a first extractor track or representation; and means for extracting the at least one decoder reset picture from a second extractor track or representation.

The further aspects relate to apparatuses and computer readable storage media stored with code thereon, which are arranged to carry out the above methods and one or more of the embodiments related thereto.

BRIEF DESCRIPTION OF THE DRAWINGS

For better understanding of the present invention, reference will now be made by way of example to the accompanying drawings in which:

FIG. 13 shows a flow chart of a decoding method according to an embodiment of the invention;

DETAILED DESCRIPTION OF SOME EXAMPLE EMBODIMENTS

Figure 1:
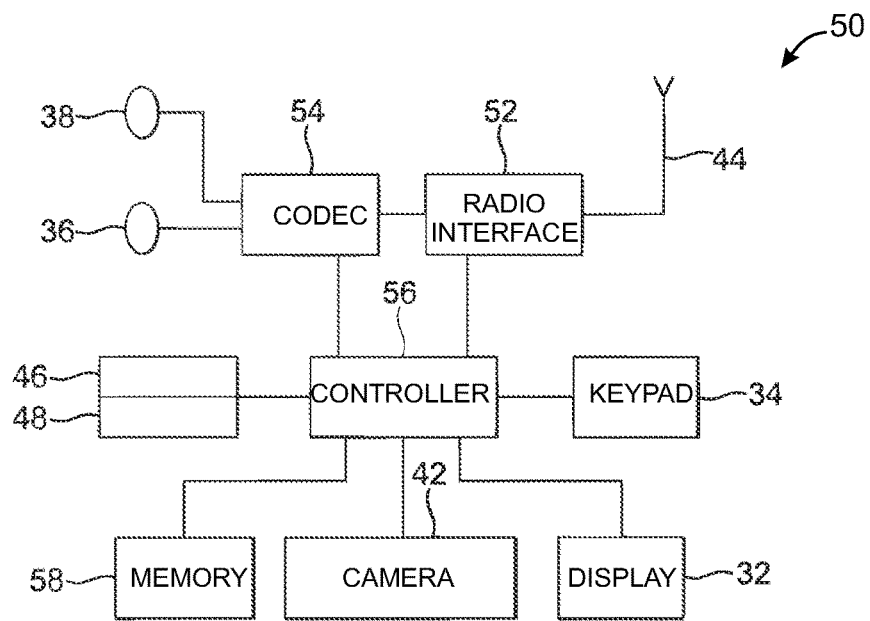
FIG. 1 shows schematically an electronic device employing embodiments of the invention.
Figure 2:
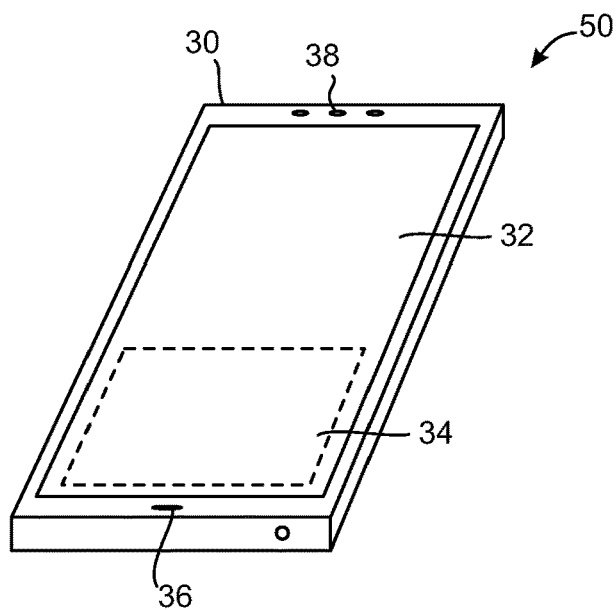
FIG. 2 shows schematically a user equipment suitable for employing embodiments of the invention.

The following describes in further detail suitable apparatus and possible mechanisms for viewport adaptive streaming. In this regard reference is first made to FIGS. 1 and 2, where FIG. 1 shows a block diagram of a video coding system according to an example embodiment as a schematic block diagram of an exemplary apparatus or electronic device 50, which may incorporate a codec according to an embodiment of the invention. FIG. 2 shows a layout of an apparatus according to an example embodiment. The elements of FIGS. 1 and 2 will be explained next.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery (or in other embodiments of the invention the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, processor or processor circuitry for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

The apparatus 50 may comprise a camera capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
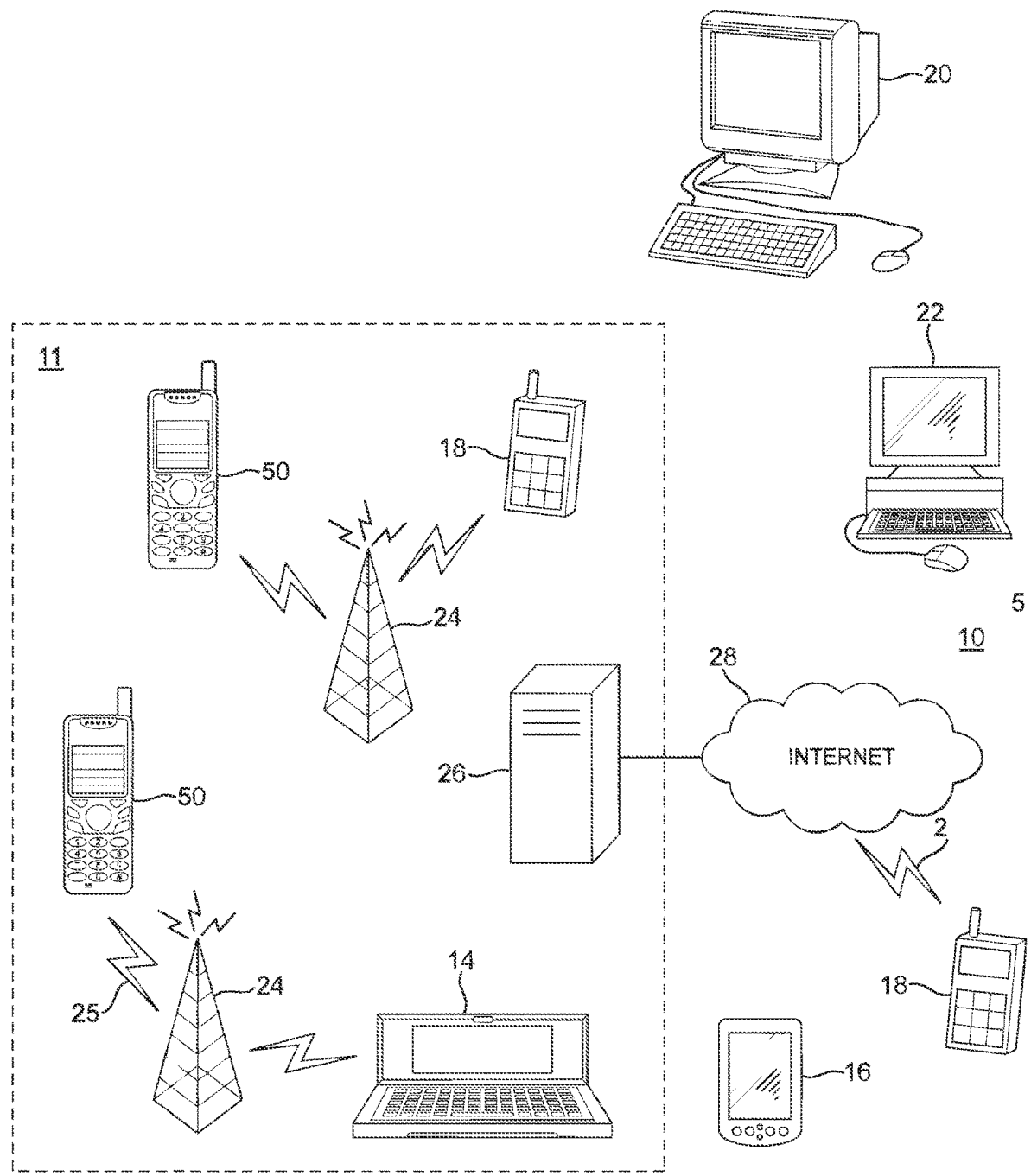
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc.), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices and/or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; i.e. a digital TV receiver, which may/may not have a display or wireless capabilities, in tablets or (laptop) personal computers (PC), which have hardware or software or combination of the encoder/decoder implementations, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Some concepts, structures, and specifications of ISOBMFF are described below as an example of a container file format, based on which the embodiments may be implemented. The aspects of the invention are not limited to ISOBMFF, but rather the description is given for one possible basis on top of which the invention may be partly or fully realized.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO family of file formats, a file includes media data and metadata that are encapsulated into boxes. Each box is identified by a four character code (4CC) and starts with a header which informs about the type and size of the box.

In files conforming to the ISO base media file format, the media data may be provided in a media data 'mdat' box and the movie 'moov' box may be used to enclose the metadata. In some cases, for a file to be operable, both of the 'mdat' and 'moov' boxes may be required to be present. The movie 'moov' box may include one or more tracks, and each track may reside in one corresponding track 'trak' box. A track may be one of the many types, including a media track that refers to samples formatted according to a media compression format (and its encapsulation to the ISO base media file format).

Movie fragments may be used e.g. when recording content to ISO files e.g. in order to avoid losing data if a recording application crashes, runs out of memory space, or some other incident occurs. Without movie fragments, data loss may occur because the file format may require that all metadata, e.g., the movie box, be written in one contiguous area of the file. Furthermore, when recording a file, there may not be sufficient amount of memory space (e.g., random access memory RAM) to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited and the use cases mentioned above be realized.

In some examples, the media samples for the movie fragments may reside in an mdat box, if they are in the same file as the moov box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality per track. The track fragments may in turn include anywhere from zero to a plurality of track runs, each of which document is a contiguous run of samples for that track. Within these structures, many fields are optional and can be defaulted. The metadata that may be included in the moof box may be limited to a subset of the metadata that may be included in a moov box and may be coded differently in some cases. Details regarding the boxes that can be included in a moof box may be found from the ISO base media file format specification. A self-contained movie fragment may be defined to consist of a moof box and an mdat box that are consecutive in the file order and where the mdat box contains the samples of the movie fragment (for which the moof box provides the metadata) and does not contain samples of any other movie fragment (i.e. any other moof box).

The track reference mechanism can be used to associate tracks with each other. The TrackReferenceBox includes box(es), each of which provides a reference from the containing track to a set of other tracks. These references are labeled through the box type (i.e. the four-character code of the box) of the contained box(es). The syntax may be specified as follows:

```
aligned(8) class TrackReferenceBox extends Box('tref') {
    TrackReferenceTypeBox [ ];
}
aligned(8) class TrackReferenceTypeBox (unsigned int(32)
reference_type) extends Box(reference_type) {
    unsigned int(32) track_IDs[ ];
}
``` track_IDs may be specified as an array of integers providing the track identifiers of the referenced tracks or track_group_id values of the referenced track groups. Each value of track_IDs[i], where i is a valid index to the track_IDs[ ] array, is an integer that provides a reference from the containing track to the track with track_ID equal to track_IDs[i] or to the track group with both track_group_id equal to track_IDs[i] and a particular bit (e.g. the least significant bit) of the flags field of TrackGroupTypeBox equal to 1. When a track_group_id value is referenced, the track reference applies to each track of the referenced track group individually unless stated otherwise in the semantics of particular track reference types. The value 0 might not be allowed to be present.

The track grouping mechanism enables indication of groups of tracks, where each group shares a particular characteristic or the tracks within a group have a particular relationship. TrackGroupBox may be contained in a TrackBox. TrackGroupBox contains zero or more boxes derived from TrackGroupTypeBox. The particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group.

The ISO Base Media File Format contains three mechanisms for timed metadata that can be associated with particular samples: sample groups, timed metadata tracks, and sample auxiliary information. Derived specification may provide similar functionality with one or more of these three mechanisms.

A sample grouping in the ISO base media file format and its derivatives, such as the AVC file format and the SVC file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

A draft amendment to the ISO Base Media File Format standard explains compact sample-to group mapping as follows:

Box Type: 'csgp'
Container: SampleTableBox or TrackFragmentBox
Mandatory: No
Quantity: Zero or more.

The compact sample to group box provides a more compact way to represent the mapping from sample to group, especially in the cases where there are repeating patterns, and when there are few sample groups of a particular type.

The design uses a vector of concatenated patterns each of which is used once by a mapping array, which associates runs of samples with repeats of that pattern. This is illustrated by the following example. In the following, each letter represents a different sample group description index value (possibly 0).

If a track has the following associations, starting from the first sample:

a b c b a b c b a b c x x a b c b a b d b
those associations might be represented by the following:

```
1. pattern_length=4; sample_count=11;
2. pattern_length=1; sample_count=2;
3. pattern_length=4; sample_count=6;
4. pattern_length=2; sample_count=2;
pattern=[
         a b c b           // pattern 1 of length 4
         x                 // pattern 2 of length 1
         a b c b           // pattern 3 of length 4
         d b               // pattern 4 of length 2
]                          // the pattern_length is thus 4+1+4+2=11
```

When sample_count[i] is equal to pattern_length[i], the pattern is not repeated.

When sample_count[i] is greater than pattern_length[i], the sample_group_description_index values of the i-th pattern are used repeatedly to map the sample_count[i] values.

It is not necessarily the case that sample_count[i] is a multiple of pattern_length[i]; the cycling may terminate in the middle of the pattern.

When the total of the sample_count[i] values for all values of i in the range of 1 to pattern_count, inclusive, is less than the total sample count, the reader should associate the samples that have no explicit group association with the default group defined in the SampleDescriptionGroupBox, if any, or else with no group.

It is an error for the total of the sample_count[i] values to be greater than the total count of actual samples described by the encompassing TrackBox or TrackFragmentBox, and the reader behaviour would then be undefined.

Syntax:

```
aligned(8) class CompactSampleToGroupBox
    extends FullBox('csgp', version, 0)
{
    unsigned int(32) grouping_type; unsigned int(1)
    index_msb_indicates_fragment_local_description;
    unsigned int(1) grouping_type_parameter_present;
    unsigned int(6) field_size_minus_1;
    if (grouping_type_parameter_present == 1) {
        unsigned int(32) grouping_type_parameter;
    }
    unsigned int(32) pattern_count;
    totalPatternLength = 0;
    for (i=1; i <= pattern_count; i++) {
        unsigned int(32) pattern_length[i];
        unsigned int(32) sample_count[i];
        totalPatternLength += pattern_length[i];
    }
    for (j=1; j <= pattern_count; j++) {
        for (k=1; k <= pattern_length[j]; k++) {
            unsigned int(field_size)
    sample_group_description_index[j][k];
            // whose msb might indicate fragment_local or global
        }
    }
}
```

Semantics:

version is an integer that specifies the version of this box, currently 0.

grouping_type is an integer that identifies the type (i.e. criterion used to form the sample groups) of the sample grouping and links it to its sample group description table with the same value for grouping type. At most one occurrence of either the 'csgp' or 'sbgp' with the same value for grouping_type (and, if used, grouping_type_parameter) shall exist for a track.

grouping_type_parameter is an indication of the sub-type of the grouping.

index_msb_indicates_fragment_local_description is a flag that must be zero when this box appears inside a 'trak' box but may be 0 or 1 when this box appears inside a 'traf' box. When it is 1, it indicates that the most significant bit (MSB) of every sample_group_description_index does not form part of the index number but instead indicates which 'sgpd' box the group description is to be found in: if the MSB is 0, the index identifies a group description from the 'trak' box's 'sgpd' box; if the MSB is 1, the index identifies a group description from the 'traf' box's 'sgpd' box.

field_size is an integer specifying the size in bits of the entries in the array of sample_group_description_index values; it shall take the value 3, 7, 15 or 31, indicating field sizes of 4, 8, 16, 32 respectively. If the field size 4 is used, then each byte contains two values: entry[i]<<4+entry[i+1]; if the sizes do not fill an integral number of bytes, the last byte is padded with zeros.

pattern_count indicates the length of the associated pattern in the pattern array that follows it. The sum of the included sample_count values indicates the number of mapped samples.

pattern_length[i] corresponds to a pattern within the second array of sample_group_description_index[j] values. Each instance of pattern_length[i] shall be greater than 0.

sample_count[i] specifies the number of samples that use the i-th pattern. sample_count[i] shall be greater than zero, and sample_count[i] shall be greater than or equal to pattern_length[i].

sample_group_description_index[j][k] is an integer that gives the index of the sample group entry which describes the samples in this group. The index ranges from 1 to the number of sample group entries in the SampleGroupDescriptionBox, inclusive, or takes the value 0 to indicate that this sample is a member of no group of this type.

In the description and embodiments, a compact sample-to-group box or alike may be used equivalently when a sample-to-group box or SampleToGroupBox is referred.

A sub-sample may be defined as a contiguous range of bytes of a sample. Information on sub-samples may be given in SubSampleInformationBox(es) that may be contained in the SampleTableBox and/or TrackFragmentBox(es). Specific definition of a sub-sample may be for a given coding system and/or for a given encapsulation format of a coding system (e.g. particular sample entry type) and/or may be further specified using the flags field of the containing SubSampleInformationBox. For example, values of the flags field for HEVC can indicate a sub-sample addressed by the SubSampleInformationBox is a NAL unit, a decoding unit, a tile, a coding tree unit row, a slice, or a coded picture. When more than one SubSampleInformationBox is present in the same container box, the value of flags may be required to differ in each of these SubSampleInformationBoxes. The syntax of SubSampleInformationBox may be specified as follows:

```
aligned(8) class SubSampleInformationBox
  extends FullBox('subs', version, flags) {
  unsigned int(32) entry_count;
  int i,j;
  for (i=0; i < entry_count; i++) {
    unsigned int(32) sample_delta;
    unsigned int(16) subsample_count;
    if (subsample_count > 0) {
      for (j=0; j < subsample_count; j++) {
        if(version == 1)
        {
          unsigned int(32) subsample_size;
        }
        else
        {
          unsigned int(16) subsample_size;
        }
        unsigned int(8) subsample_priority;
        unsigned int(8) discardable;
        unsigned int(32) codec_specific_parameters;
      }
    }
  }
}
```

The semantics of syntax elements of SubSampleInformationBox may be specified as follows: version is an integer that specifies the version of this box. entry_count is an integer that gives the number of entries in the following table. sample_delta is an integer that indicates the sample having sub-sample structure. It is coded as the difference, in decoding order, between the desired sample number, and the sample number indicated in the previous entry. If the current entry is the first entry in the track, the value indicates the sample number of the first sample having sub-sample information, that is, the value is the difference between the sample number and zero (0). If the current entry is the first entry in a track fragment with preceding non-empty track fragments, the value indicates the difference between the sample number of the first sample having sub-sample information and the sample number of the last sample in the previous track fragment. If the current entry is the first entry in a track fragment without any preceding track fragments, the value indicates the sample number of the first sample having sub-sample information, that is, the value is the difference between the sample number and zero (0). This implies that the sample_delta for the first entry describing the first sample in the track or in the track fragment is always 1. subsample_count is an integer that specifies the number of sub-sample for the current sample. If there is no sub-sample structure, then this field takes the value 0. subsample_size is an integer that specifies the size, in bytes, of the current sub-sample. subsample_priority is an integer specifying the degradation priority for each sub-sample. Higher values of subsample_priority, indicate sub-samples which are important to, and have a greater impact on, the decoded quality. discardable equal to 0 means that the sub-sample is required to decode the current sample, while equal to 1 means the sub-sample is not required to decode the current sample but may be used for enhancements, e.g., the sub-sample consists of supplemental enhancement information (SEI) messages. codec_specific_parameters is defined by the codec and/or its encapsulation format (e.g. sample entry type) in use. If no such definition is available, this field is set to 0.

The Matroska file format is capable of (but not limited to) storing any of video, audio, picture, or subtitle tracks in one file. Matroska may be used as a basis format for derived file formats, such as WebM. Matroska uses Extensible Binary Meta Language (EBML) as basis. EBML specifies a binary and octet (byte) aligned format inspired by the principle of XML. EBML itself is a generalized description of the technique of binary markup. A Matroska file consists of Elements that make up an EBML "document." Elements incorporate an Element ID, a descriptor for the size of the element, and the binary data itself. Elements can be nested. A Segment Element of Matroska is a container for other top-level (level 1) elements. A Matroska file may comprise (but is not limited to be composed of) one Segment. Multimedia data in Matroska files is organized in Clusters (or Cluster Elements), each containing typically a few seconds of multimedia data. A Cluster comprises BlockGroup elements, which in turn comprise Block Elements. A Cues Element comprises metadata which may assist in random access or seeking and may include file pointers or respective timestamps for seek points.

Video codec consists of an encoder that transforms the input video into a compressed representation suited for storage/transmission and a decoder that can uncompress the compressed video representation back into a viewable form. A video encoder and/or a video decoder may also be separate from each other, i.e. need not form a codec. Typically encoder discards some information in the original video sequence in order to represent the video in a more compact form (that is, at lower bitrate).

Typical hybrid video encoders, for example many encoder implementations of ITU-T H.263 and H.264, encode the video information in two phases. Firstly pixel values in a certain picture area (or "block") are predicted for example by motion compensation means (finding and indicating an area in one of the previously coded video frames that corresponds closely to the block being coded) or by spatial means (using the pixel values around the block to be coded in a specified manner). Secondly the prediction error, i.e. the difference between the predicted block of pixels and the original block of pixels, is coded. This is typically done by transforming the difference in pixel values using a specified transform (e.g. Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, i.e., either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently if they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
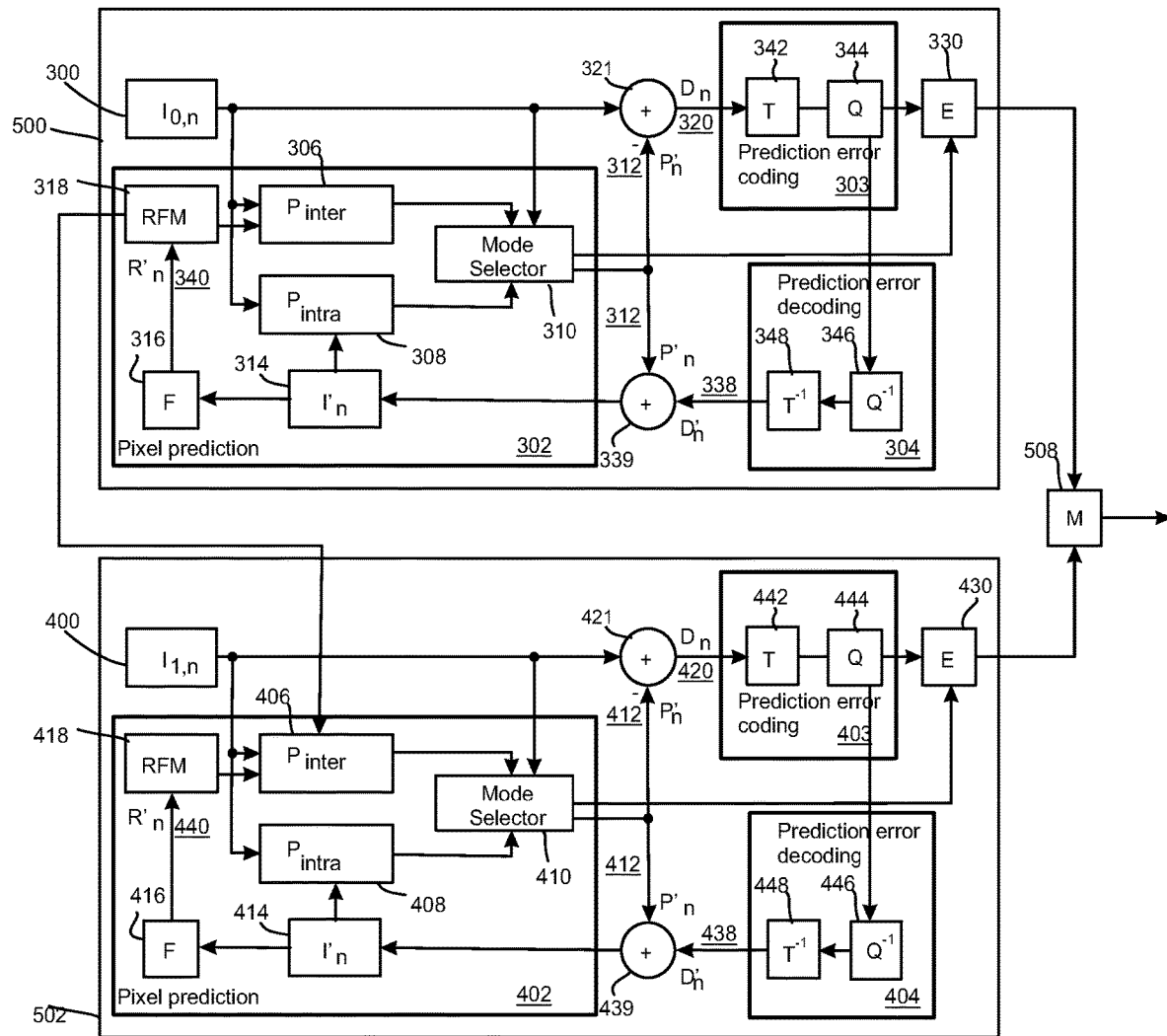
FIG. 4 shows schematically an encoder suitable for implementing embodiments of the invention.

FIG. 4 shows a block diagram of a video encoder suitable for employing embodiments of the invention. FIG. 4 presents an encoder for two layers, but it would be appreciated that presented encoder could be similarly extended to encode more than two layers. FIG. 4 illustrates an embodiment of a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives 300 base layer images of a video stream to be encoded at both the inter-predictor 306 (which determines the difference between the image and a motion compensated reference frame 318) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer picture 300. Correspondingly, the pixel predictor 402 of the second encoder section 502 receives 400 enhancement layer images of a video stream to be encoded at both the inter-predictor 406 (which determines the difference between the image and a motion compensated reference frame 418) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector is passed to a first summing device 321, 421. The first summing device may subtract the output of the pixel predictor 302, 402 from the base layer picture 300/enhancement layer picture 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer picture 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer pictures 400 is compared in inter-prediction operations. Moreover, the reference frame memory 418 may be connected to the inter-predictor 406 to be used as the reference image against which a future enhancement layer picture 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, e.g. the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414. The prediction error decoder may be considered to comprise a dequantizer 361, 461, which dequantizes the quantized coefficient values, e.g. DCT coefficients, to reconstruct the transform signal and an inverse transformation unit 363, 463, which performs the inverse transformation to the reconstructed transform signal wherein the output of the inverse transformation unit 363, 463 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream e.g. by a multiplexer 508.

The H.264/AVC standard was developed by the Joint Video Team (JVT) of the Video Coding Experts Group (VCEG) of the Telecommunications Standardization Sector of International Telecommunication Union (ITU-T) and the Moving Picture Experts Group (MPEG) of International Organisation for Standardization (ISO)/International Electrotechnical Commission (IEC). The H.264/AVC standard is published by both parent standardization organizations, and it is referred to as ITU-T Recommendation H.264 and ISO/IEC International Standard 14496-10, also known as MPEG-4 Part 10 Advanced Video Coding (AVC). There have been multiple versions of the H.264/AVC standard, integrating new extensions or features to the specification. These extensions include Scalable Video Coding (SVC) and Multiview Video Coding (MVC).

Version 1 of the High Efficiency Video Coding (H.265/HEVC a.k.a. HEVC) standard was developed by the Joint Collaborative Team—Video Coding (JCT-VC) of VCEG and MPEG. The standard was published by both parent standardization organizations, and it is referred to as ITU-T Recommendation H.265 and ISO/IEC International Standard 23008-2, also known as MPEG-H Part 2 High Efficiency Video Coding (HEVC). Later versions of H.265/HEVC included scalable, multiview, fidelity range extensions, three-dimensional, and screen content coding extensions which may be abbreviated SHVC, MV-HEVC, REXT, 3D-HEVC, and SCC, respectively.

SHVC, MV-HEVC, and 3D-HEVC use a common basis specification, specified in Annex F of the version 2 of the HEVC standard. This common basis comprises for example high-level syntax and semantics e.g. specifying some of the characteristics of the layers of the bitstream, such as inter-layer dependencies, as well as decoding processes, such as reference picture list construction including inter-layer reference pictures and picture order count derivation for multi-layer bitstream. Annex F may also be used in potential subsequent multi-layer extensions of HEVC. It is to be understood that even though a video encoder, a video decoder, encoding methods, decoding methods, bitstream structures, and/or embodiments may be described in the following with reference to specific extensions, such as SHVC and/or MV-HEVC, they are generally applicable to any multi-layer extensions of HEVC, and even more generally to any multi-layer video coding scheme.

The standardization of the Versatile Video Coding (VVC, H.266, or H.266/VVC) standard has been started in the Joint Video Experts Team (JVET) of ITU-T and MPEG.

Some key definitions, bitstream and coding structures, and concepts of H.264/AVC and HEVC are described in this section as an example of a video encoder, decoder, encoding method, decoding method, and a bitstream structure, wherein the embodiments may be implemented. Some of the key definitions, bitstream and coding structures, and concepts of H.264/AVC are the same as in HEVC—hence, they are described below jointly. The aspects of the invention are not limited to H.264/AVC or HEVC, but rather the description is given for one possible basis on top of which the invention may be partly or fully realized. Many aspects described below in the context of H.264/AVC or HEVC may apply to VVC, and the aspects of the invention may hence be applied to VVC.

Similarly to many earlier video coding standards, the bitstream syntax and semantics as well as the decoding process for error-free bitstreams are specified in H.264/AVC and HEVC. The encoding process is not specified, but encoders must generate conforming bitstreams. Bitstream and decoder conformance can be verified with the Hypothetical Reference Decoder (HRD). The standards contain coding tools that help in coping with transmission errors and losses, but the use of the tools in encoding is optional and no decoding process has been specified for erroneous bitstreams.

The elementary unit for the input to an H.264/AVC or HEVC encoder and the output of an H.264/AVC or HEVC decoder, respectively, is a picture. A picture given as an input to an encoder may also be referred to as a source picture, and a picture decoded by a decoded may be referred to as a decoded picture.

The source and decoded pictures are each comprised of one or more sample arrays, such as one of the following sets of sample arrays:

Luma (Y) only (monochrome).
Luma and two chroma (YCbCr or YCgCo).
Green, Blue and Red (GBR, also known as RGB).
Arrays representing other unspecified monochrome or tri-stimulus color samplings (for example, YZX, also known as XYZ).

In the following, these arrays may be referred to as luma (or L or Y) and chroma, where the two chroma arrays may be referred to as Cb and Cr; regardless of the actual color representation method in use. The actual color representation method in use can be indicated e.g. in a coded bitstream e.g. using the Video Usability Information (VUI) syntax of H.264/AVC and/or HEVC. A component may be defined as an array or single sample from one of the three sample arrays (luma and two chroma) or the array or a single sample of the array that compose a picture in monochrome format.

In H.264/AVC and HEVC, a picture may either be a frame or a field. A frame comprises a matrix of luma samples and possibly the corresponding chroma samples. A field is a set of alternate sample rows of a frame and may be used as encoder input, when the source signal is interlaced. Chroma sample arrays may be absent (and hence monochrome sampling may be in use) or chroma sample arrays may be subsampled when compared to luma sample arrays. Chroma formats may be summarized as follows:

In monochrome sampling there is only one sample array, which may be nominally considered the luma array.

In 4:2:0 sampling, each of the two chroma arrays has half the height and half the width of the luma array.

In 4:2:2 sampling, each of the two chroma arrays has the same height and half the width of the luma array.

In 4:4:4 sampling when no separate color planes are in use, each of the two chroma arrays has the same height and width as the luma array.

In H.264/AVC and HEVC, it is possible to code sample arrays as separate color planes into the bitstream and respectively decode separately coded color planes from the bitstream. When separate color planes are in use, each one of them is separately processed (by the encoder and/or the decoder) as a picture with monochrome sampling.

A partitioning may be defined as a division of a set into subsets such that each element of the set is in exactly one of the subsets.

When describing the operation of HEVC encoding and/or decoding, the following terms may be used. A coding block may be defined as an N×N block of samples for some value of N such that the division of a coding tree block into coding blocks is a partitioning. A coding tree block (CTB) may be defined as an N×N block of samples for some value of N such that the division of a component into coding tree blocks is a partitioning. A coding tree unit (CTU) may be defined as a coding tree block of luma samples, two corresponding coding tree blocks of chroma samples of a picture that has three sample arrays, or a coding tree block of samples of a monochrome picture or a picture that is coded using three separate color planes and syntax structures used to code the samples. A coding unit (CU) may be defined as a coding block of luma samples, two corresponding coding blocks of chroma samples of a picture that has three sample arrays, or a coding block of samples of a monochrome picture or a picture that is coded using three separate color planes and syntax structures used to code the samples. A CU with the maximum allowed size may be named as LCU (largest coding unit) or coding tree unit (CTU) and the video picture is divided into non-overlapping LCUs.

A CU consists of one or more prediction units (PU) defining the prediction process for the samples within the CU and one or more transform units (TU) defining the prediction error coding process for the samples in the said CU. Typically, a CU consists of a square block of samples with a size selectable from a predefined set of possible CU sizes. Each PU and TU can be further split into smaller PUs and TUs in order to increase granularity of the prediction and prediction error coding processes, respectively. Each PU has prediction information associated with it defining what kind of a prediction is to be applied for the pixels within that PU (e.g. motion vector information for inter predicted PUs and intra prediction directionality information for intra predicted PUs).

Each TU can be associated with information describing the prediction error decoding process for the samples within the said TU (including e.g. DCT coefficient information). It is typically signalled at CU level whether prediction error coding is applied or not for each CU. In the case there is no prediction error residual associated with the CU, it can be considered there are no TUs for the said CU. The division of the image into CUs, and division of CUs into PUs and TUs is typically signalled in the bitstream allowing the decoder to reproduce the intended structure of these units.

In HEVC, a picture can be partitioned in tiles, which are rectangular and contain an integer number of LCUs. In HEVC, the partitioning to tiles forms a regular grid, where heights and widths of tiles differ from each other by one LCU at the maximum. In HEVC, a slice is defined to be an integer number of coding tree units contained in one independent slice segment and all subsequent dependent slice segments (if any) that precede the next independent slice segment (if any) within the same access unit. In HEVC, a slice segment is defined to be an integer number of coding tree units ordered consecutively in the tile scan and contained in a single NAL unit. The division of each picture into slice segments is a partitioning. In HEVC, an independent slice segment is defined to be a slice segment for which the values of the syntax elements of the slice segment header are not inferred from the values for a preceding slice segment, and a dependent slice segment is defined to be a slice segment for which the values of some syntax elements of the slice segment header are inferred from the values for the preceding independent slice segment in decoding order. In HLVC, a slice header is defined to be the slice segment header of the independent slice segment that is a current slice segment or is the independent slice segment that precedes a current dependent slice segment, and a slice segment header is defined to be a part of a coded slice segment containing the data elements pertaining to the first or all coding tree units represented in the slice segment. The CUs are scanned in the raster scan order of LCUs within tiles or within a picture, if tiles are not in use. Within an LCU, the CUs have a specific scan order.

The slice segment layer RBSP in HLVC has the following syntax:

| | Descriptor |
|---|---|
| slice_segment_layer_rbsp( ) {<br>  slice_segment_header( )<br>  slice_segment_data( )<br>  rbsp_slice_segment_trailing_bits( )<br>} | |

The slice_segment_header( ) syntax starts as follows:

| | Descriptor |
|---|---|
| slice_segment_header( ) { | |
|   first_slice_segment_in_pic_flag | u(1) |
|   if( nal_unit_type >= BLA_W_LP && nal_unit_type <= RSV_IRAP_VCL23 ) | |
|     no_output_of_prior_pics_flag | u(1) |
|   slice_pic_parameter_set_id | ue(v) |
|   if( !first_slice_segment_in_pic_flag ) { | |
|     if( dependent_slice_segments_enabled_flag ) | |
|       dependent_slice_segment_flag | u(1) |
|     slice_segment_address | u(v) |
|   } | |
|   if( !dependent_slice_segment_flag ) { | |
|     for( i = 0; i < num_extra_slice_header_bits; i++ ) | |
|       slice_reserved_flag[ i ] | u(1) |
|     slice_type | ue(v) |
|     if( output_flag_present_flag ) | |
|       pic_output_flag | u(1) |
| ... | |

Herein, first_slice_segment_in_pic_flag and slice_segment_address depend on the position of the slice segment within the picture, while the values of other syntax elements are many times unchanged in all independent slice segments of the same coded picture.

A motion-constrained tile set (MCTS) is such that the inter prediction process is constrained in encoding such that no sample value outside the motion-constrained tile set, and no sample value at a fractional sample position that is derived using one or more sample values outside the motion-constrained tile set, is used for inter prediction of any sample within the motion-constrained tile set. Additionally, the encoding of an MCTS is constrained in a manner that motion vector candidates are not derived from blocks outside the MCTS. This may be enforced by turning off temporal motion vector prediction of HEVC, or by disallowing the encoder to use the TMVP candidate or any motion vector prediction candidate following the TMVP candidate in the merge or AMVP candidate list for PUs located directly left of the right tile boundary of the MCTS except the last one at the bottom right of the MCTS. In general, an MCTS may be defined to be a tile set that is independent of any sample values and coded data, such as motion vectors, that are outside the MCTS. In some cases, an MCTS may be required to form a rectangular area. It should be understood that depending on the context, an MCTS may refer to the tile set within a picture or to the respective tile set in a sequence of pictures. The respective tile set may be, but in general need not be, collocated in the sequence of pictures.

It is noted that sample locations used in inter prediction may be saturated by the encoding and/or decoding process so that a location that would be outside the picture otherwise is saturated to point to the corresponding boundary sample of the picture. Hence, if a tile boundary is also a picture boundary, in some use cases, encoders may allow motion vectors to effectively cross that boundary or a motion vector to effectively cause fractional sample interpolation that would refer to a location outside that boundary, since the sample locations are saturated onto the boundary. In other use cases, specifically if a coded tile may be extracted from a bitstream where it is located on a position adjacent to a picture boundary to another bitstream where the tile is located on a position that is not adjacent to a picture boundary, encoders may constrain the motion vectors on picture boundaries similarly to any MCTS boundaries.

The temporal motion-constrained tile sets SEI message of HEVC can be used to indicate the presence of motion-constrained tile sets in the bitstream.

It needs to be understood that even though some examples and embodiments are described with respect to MCTSs, they could be similarly realized with other similar concepts of independently decodable spatiotemporal units. Moreover, motion constraints for such spatiotemporal units could be specified similarly to how MCTSs above. Example of such spatiotemporal units include but are not limited to motion-constrained slices and motion-constrained pictures. A motion-constrained slice is such that the inter prediction process is constrained in encoding such that no syntax or derived variables outside the motion-constrained slice, no sample value outside the motion-constrained slice, and no sample value at a fractional sample position that is derived using one or more sample values outside the motion-constrained slice, is used for inter prediction of any sample within the motion-constrained slice. A motion-constrained picture is such that the inter prediction process is constrained in encoding such that no syntax or derived variables outside the motion-constrained picture without special consideration of picture boundaries, no sample value outside the motion-constrained picture without special consideration of picture boundaries, and no sample value at a fractional sample position that is derived using one or more sample values outside the motion-constrained picture without special consideration of picture boundaries, is used for inter prediction of any sample within the motion-constrained picture. Such special consideration of picture boundaries could for example be saturation of coordinates to be within picture boundaries and inferring blocks or motion vectors outside picture boundaries to be unavailable in a prediction process. When the phrase spatiotemporal unit is used in the context of a single time instance or single picture, it can be considered as a spatial unit, corresponding to a certain subset of a coded picture and, when decoded, a certain subset of a decoded picture area.

The decoder reconstructs the output video by applying prediction means similar to the encoder to form a predicted representation of the pixel blocks (using the motion or spatial information created by the encoder and stored in the compressed representation) and prediction error decoding (inverse operation of the prediction error coding recovering the quantized prediction error signal in spatial pixel domain). After applying prediction and prediction error decoding means the decoder sums up the prediction and prediction error signals (pixel values) to form the output video frame. The decoder (and encoder) can also apply additional filtering means to improve the quality of the output video before passing it for display and/or storing it as prediction reference for the forthcoming frames in the video sequence.

The filtering may for example include one more of the following: deblocking, sample adaptive offset (SAO), and/or adaptive loop filtering (ALF). H.264/AVC includes a deblocking, whereas HEVC includes both deblocking and SAO.

In typical video codecs the motion information is indicated with motion vectors associated with each motion compensated image block, such as a prediction unit. Each of these motion vectors represents the displacement of the image block in the picture to be coded (in the encoder side) or decoded (in the decoder side) and the prediction source block in one of the previously coded or decoded pictures. In order to represent motion vectors efficiently those are typically coded differentially with respect to block specific predicted motion vectors. In typical video codecs the predicted motion vectors are created in a predefined way, for example calculating the median of the encoded or decoded motion vectors of the adjacent blocks. Another way to create motion vector predictions is to generate a list of candidate predictions from adjacent blocks and/or co-located blocks in temporal reference pictures and signalling the chosen candidate as the motion vector predictor. In addition to predicting the motion vector values, it can be predicted which reference picture(s) are used for motion-compensated prediction and this prediction information may be represented for example by a reference index of previously coded/decoded picture. The reference index is typically predicted from adjacent blocks and/or co-located blocks in temporal reference picture. Moreover, typical high efficiency video codecs employ an additional motion information coding/decoding mechanism, often called merging/merge mode, where all the motion field information, which includes motion vector and corresponding reference picture index for each available reference picture list, is predicted and used without any modification/correction. Similarly, predicting the motion field information is carried out using the motion field information of adjacent blocks and/or co-located blocks in temporal reference pictures and the used motion field information is signalled among a list of motion field candidate list filled with motion field information of available adjacent/co-located blocks.

In typical video codecs the prediction residual after motion compensation is first transformed with a transform kernel (like DCT) and then coded. The reason for this is that often there still exists some correlation among the residual and transform can in many cases help reduce this correlation and provide more efficient coding.

Typical video encoders utilize Lagrangian cost functions to find optimal coding modes, e.g. the desired coding mode for a block and associated motion vectors. This kind of cost function uses a weighting factor $\lambda$ to tie together the (exact or estimated) image distortion due to lossy coding methods and the (exact or estimated) amount of information that is required to represent the pixel values in an image area:

$$C=D+\lambda R, \quad (1)$$

where C is the Lagrangian cost to be minimized, D is the image distortion (e.g. Mean Squared Error) with the mode and motion vectors considered, and R the number of bits needed to represent the required data to reconstruct the image block in the decoder (including the amount of data to represent the candidate motion vectors).

Video coding standards and specifications may allow encoders to divide a coded picture to coded slices or alike. In-picture prediction is typically disabled across slice boundaries. Thus, slices can be regarded as a way to split a coded picture to independently decodable pieces. In H.264/AVC and HEVC, in-picture prediction may be disabled across slice boundaries. Thus, slices can be regarded as a way to split a coded picture into independently decodable pieces, and slices are therefore often regarded as elementary units for transmission. In many cases, encoders may indicate in the bitstream which types of in-picture prediction are turned off across slice boundaries, and the decoder operation takes this information into account for example when concluding which prediction sources are available. For example, samples from a neighboring CU may be regarded as unavailable for intra prediction, if the neighboring CU resides in a different slice.

An elementary unit for the output of an H.264/AVC or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of an RBSP interspersed as necessary with emulation prevention bytes. A raw byte sequence payload (RBSP) may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units consist of a header and payload. In H.264/AVC and HEVC, the NAL unit header indicates the type of the NAL unit In HEVC, a two-byte NAL unit header is used for all specified NAL unit types. The NAL unit header contains one reserved bit, a six-bit NAL unit type indication, a three-bit nuh_temporal_id_plus1 indication for temporal level (may be required to be greater than or equal to 1) and a six-bit nuh_layer_id syntax element. The temporal_id_plus1 syntax element may be regarded as a temporal identifier for the NAL unit, and a zero-based TemporalId variable may be derived as follows: TemporalId=temporal_id_plus1−1. The abbreviation TID may be used to interchangeably with the TemporalId variable. TemporalId equal to 0 corresponds to the lowest temporal level. The value of temporal_id_plus1 is required to be non-zero in order to avoid start code emulation involving the two NAL unit header bytes. The bitstream created by excluding all VCL NAL units having a TemporalId greater than or equal to a selected value and including all other VCL NAL units remains conforming. Consequently, a picture having TemporalId equal to tid_value does not use any picture having a TemporalId greater than tid_value as inter prediction reference. A sub-layer or a temporal sub-layer may be defined to be a temporal scalable layer (or a temporal layer, TL) of a temporal scalable bitstream, consisting of VCL NAL units with a particular value of the TemporalId variable and the associated non-VCL NAL units. nuh_layer_id can be understood as a scalability layer identifier.

NAL units can be categorized into Video Coding Layer (VCL) NAL units and non-VCL NAL units. VCL NAL units are typically coded slice NAL units. In HEVC, VCL NAL units contain syntax elements representing one or more CU.

In HEVC, abbreviations for picture types may be defined as follows: trailing (TRAIL) picture, Temporal Sub-layer Access (TSA), Step-wise Temporal Sub-layer Access (STSA), Random Access Decodable Leading (RADL) picture, Random Access Skipped Leading (RASL) picture, Broken Link Access (BLA) picture, Instantaneous Decoding Refresh (IDR) picture, Clean Random Access (CRA) picture. Some picture types are more fine-grained as indicated in the table above. For example, three types of BLA pictures are specified, BLA without leading pictures, BLA with decodable leading pictures (i.e. without RASL pictures), and BLA with any leading pictures.

A Random Access Point (RAP) picture, which may also be referred to as a random-access picture or an intra random access point (IRAP) picture, may comprise only intra-coded image segments. Furthermore, a RAP picture may constrain subsequent pictures in output order to be such that they can be correctly decoded without performing the decoding process of any pictures that precede the RAP picture in decoding order. In HEVC, an IRAP picture may be a BLA picture, a CRA picture or an IDR picture. In HEVC, provided the necessary parameter sets are available when they need to be activated, an IRAP picture at an independent layer and all subsequent non-RASL pictures at the independent layer in decoding order can be correctly decoded without performing the decoding process of any pictures that precede the IRAP picture in decoding order. There may be pictures in a bitstream that contain only intra-coded slices that are not IRAP pictures.

In HEVC a CRA picture may be the first picture in the bitstream in decoding order, or may appear later in the bitstream. CRA pictures in HEVC allow so-called leading pictures that follow the CRA picture in decoding order but precede it in output order. Some of the leading pictures, so-called RASL pictures, may use pictures decoded before the CRA picture as a reference. Pictures that follow a CRA picture in both decoding and output order are decodable if random access is performed at the CRA picture, and hence clean random access is achieved similarly to the clean random access functionality of an IDR picture.

A CRA picture may have associated RADL or RASL pictures. When a CRA picture is the first picture in the bitstream in decoding order, the CRA picture is the first picture of a coded video sequence in decoding order, and any associated RASL pictures are not output by the decoder and may not be decodable, as they may contain references to pictures that are not present in the bitstream.

A leading picture is a picture that precedes the associated RAP picture in output order. The associated RAP picture is the previous RAP picture in decoding order (if present). A leading picture is either a RADL picture or a RASL picture.

All RASL pictures are leading pictures of an associated BLA or CRA picture. When the associated RAP picture is a BLA picture or is the first coded picture in the bitstream, the RASL picture is not output and may not be correctly decodable, as the RASL picture may contain references to pictures that are not present in the bitstream. However, a RASL picture can be correctly decoded if the decoding had started from a RAP picture before the associated RAP picture of the RASL picture. RASL pictures are not used as reference pictures for the decoding process of non-RASL pictures. When present, all RASL pictures precede, in decoding order, all trailing pictures of the same associated RAP picture. In some drafts of the HEVC standard, a RASL picture was referred to a Tagged for Discard (TFD) picture.

All RADL pictures are leading pictures. RADL pictures are not used as reference pictures for the decoding process of trailing pictures of the same associated RAP picture. When present, all RADL pictures precede, in decoding order, all trailing pictures of the same associated RAP picture. RADL pictures do not refer to any picture preceding the associated RAP picture in decoding order and can therefore be correctly decoded when the decoding starts from the associated RAP picture.

When a part of a bitstream starting from a CRA picture is included in another bitstream, the RASL pictures associated with the CRA picture might not be correctly decodable, because some of their reference pictures might not be present in the combined bitstream. To make such a splicing operation straightforward, the NAL unit type of the CRA picture can be changed to indicate that it is a BLA picture. The RASL pictures associated with a BLA picture may not be correctly decodable hence are not be output/displayed. Furthermore, the RASL pictures associated with a BLA picture may be omitted from decoding.

A BLA picture may be the first picture in the bitstream in decoding order, or may appear later in the bitstream. Each BLA picture begins a new coded video sequence, and has similar effect on the decoding process as an IDR picture. However, a BLA picture contains syntax elements that specify a non-empty reference picture set. When a BLA picture has nal_unit_type equal to BLA_W_LP, it may have associated RASL pictures, which are not output by the decoder and may not be decodable, as they may contain references to pictures that are not present in the bitstream. When a BLA picture has nal_unit_type equal to BLA_W_LP, it may also have associated RADL pictures, which are specified to be decoded. When a BLA picture has nal_unit_type equal to BLA_W_DLP, it does not have associated RASL pictures but may have associated RADL pictures, which are specified to be decoded. When a BLA picture has nal_unit_type equal to BLA_N_LP, it does not have any associated leading pictures.

An IDR picture having nal_unit_type equal to IDR_N_LP does not have associated leading pictures present in the bitstream. An IDR picture having nal_unit_type equal to IDR_W_LP does not have associated RASL pictures present in the bitstream, but may have associated RADL pictures in the bitstream.

When the value of nal_unit_type is equal to TRAIL_N, TSA_N, STSA_N, RADL_N, RASL_N, RSV_VCL_N10, RSV_VCL_N12, or RSV_VCL_N14, the decoded picture is not used as a reference for any other picture of the same temporal sub-layer. That is, in HEVC, when the value of nal_unit_type is equal to TRAIL_N, TSA_N, STSA_N, RADL_N, RASL_N, RSV_VCL_N10, RSV_VCL_N12, or RSV_VCL_N14, the decoded picture is not included in any of RefPicSetStCurrBefore, RefPicSetStCurrAfter and RefPicSetLtCurr of any picture with the same value of TemporalId. A coded picture with nal_unit_type equal to TRAIL_N, TSA_N, STSA_N, RADL_N, RASL_N, RSV_VCL_N10, RSV_VCL_N12, or RSV_VCL_N14 may be discarded without affecting the decodability of other pictures with the same value of TemporalId.

A trailing picture may be defined as a picture that follows the associated RAP picture in output order. Any picture that is a trailing picture does not have nal_unit_type equal to RADL_N, RADL_R, RASL_N or RASL_R. Any picture that is a leading picture may be constrained to precede, in decoding order, all trailing pictures that are associated with the same RAP picture. No RASL pictures are present in the bitstream that are associated with a BLA picture having nal_unit_type equal to BLA_W_DLP or BLA_N_LP. No RADL pictures are present in the bitstream that are associated with a BLA picture having nal_unit_type equal to BLA_N_LP or that are associated with an IDR picture having nal_unit_type equal to IDR_N_LP. Any RASL picture associated with a CRA or BLA picture may be constrained to precede any RADL picture associated with the CRA or BLA picture in output order. Any RASL picture associated with a CRA picture may be constrained to follow, in output order, any other RAP picture that precedes the CRA picture in decoding order.

In HEVC there are two picture types, the TSA and STSA picture types that can be used to indicate temporal sub-layer switching points. If temporal sub-layers with TemporalId up to N had been decoded until the TSA or STSA picture (exclusive) and the TSA or STSA picture has TemporalId equal to N+1, the TSA or STSA picture enables decoding of all subsequent pictures (in decoding order) having TemporalId equal to N+1. The TSA picture type may impose restrictions on the TSA picture itself and all pictures in the same sub-layer that follow the TSA picture in decoding order. None of these pictures is allowed to use inter prediction from any picture in the same sub-layer that precedes the TSA picture in decoding order. The TSA definition may further impose restrictions on the pictures in higher sub-layers that follow the TSA picture in decoding order. None of these pictures is allowed to refer a picture that precedes the TSA picture in decoding order if that picture belongs to the same or higher sub-layer as the TSA picture. TSA pictures have TemporalId greater than 0. The STSA is similar to the TSA picture but does not impose restrictions on the pictures in higher sub-layers that follow the STSA picture in decoding order and hence enable up-switching only onto the sub-layer where the STSA picture resides. In nested temporal scalability, all (trailing) pictures with TemporalId greater than 0 could be labeled as TSA pictures.

A non-VCL NAL unit may be for example one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

Parameters that remain unchanged through a coded video sequence may be included in a sequence parameter set. In addition to the parameters that may be needed by the decoding process, the sequence parameter set may optionally contain video usability information (VUI), which includes parameters that may be important for buffering, picture output timing, rendering, and resource reservation. In HEVC a sequence parameter set RBSP includes parameters that can be referred to by one or more picture parameter set RBSPs or one or more SEI NAL units containing a buffering period SEI message. A picture parameter set contains such parameters that are likely to be unchanged in several coded pictures. A picture parameter set RBSP may include parameters that can be referred to by the coded slice NAL units of one or more coded pictures.

In HEVC, a video parameter set (VPS) may be defined as a syntax structure containing syntax elements that apply to zero or more entire coded video sequences as determined by the content of a syntax element found in the SPS referred to by a syntax element found in the PPS referred to by a syntax element found in each slice segment header.

A video parameter set RBSP may include parameters that can be referred to by one or more sequence parameter set RBSPs.

The relationship and hierarchy between video parameter set (VPS), sequence parameter set (SPS), and picture parameter set (PPS) may be described as follows. VPS resides one level above SPS in the parameter set hierarchy and in the context of scalability and/or 3D video. VPS may include parameters that are common for all slices across all (scalability or view) layers in the entire coded video sequence. SPS includes the parameters that are common for all slices in a particular (scalability or view) layer in the entire coded video sequence, and may be shared by multiple (scalability or view) layers. PPS includes the parameters that are common for all slices in a particular layer representation (the representation of one scalability or view layer in one access unit) and are likely to be shared by all slices in multiple layer representations.

VPS may provide information about the dependency relationships of the layers in a bitstream, as well as many other information that are applicable to all slices across all (scalability or view) layers in the entire coded video sequence. VPS may be considered to comprise two parts, the base VPS and a VPS extension, where the VPS extension may be optionally present.

Out-of-band transmission, signaling or storage can additionally or alternatively be used for other purposes than tolerance against transmission errors, such as ease of access or session negotiation. For example, a sample entry of a track in a file conforming to the ISO Base Media File Format may comprise parameter sets, while the coded data in the bitstream is stored elsewhere in the file or in another file. The phrase along the bitstream (e.g. indicating along the bitstream) may be used in claims and described embodiments to refer to out-of-band transmission, signaling, or storage in a manner that the out-of-band data is associated with the bitstream. The phrase decoding along the bitstream or alike may refer to decoding the referred out-of-band data (which may be obtained from out-of-band transmission, signaling, or storage) that is associated with the bitstream.

A SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

A coded picture is a coded representation of a picture.

In HEVC, a coded picture may be defined as a coded representation of a picture containing all coding tree units of the picture. In HEVC, an access unit (AU) may be defined as a set of NAL units that are associated with each other according to a specified classification rule, are consecutive in decoding order, and contain at most one picture with any specific value of nuh_layer_id. In addition to containing the VCL NAL units of the coded picture, an access unit may also contain non-VCL NAL units. Said specified classification rule may for example associate pictures with the same output time or picture output count value into the same access unit.

A bitstream may be defined as a sequence of bits, in the form of a NAL unit stream or a byte stream, that forms the representation of coded pictures and associated data forming one or more coded video sequences. A first bitstream may be followed by a second bitstream in the same logical channel, such as in the same file or in the same connection of a communication protocol. An elementary stream (in the context of video coding) may be defined as a sequence of one or more bitstreams. The end of the first bitstream may be indicated by a specific NAL unit, which may be referred to as the end of bitstream (EOB) NAL unit and which is the last NAL unit of the bitstream. In HEVC and its current draft extensions, the EOB NAL unit is required to have nuh_layer_id equal to 0.

A coded video sequence may be defined as such a sequence of coded pictures in decoding order that is independently decodable and is followed by another coded video sequence or the end of the bitstream or an end of sequence NAL unit.

In HEVC, a coded video sequence may additionally or alternatively (to the specification above) be specified to end, when a specific NAL unit, which may be referred to as an end of sequence (EOS) NAL unit, appears in the bitstream and has nuh_layer_id equal to 0.

A group of pictures (GOP) and its characteristics may be defined as follows. A GOP can be decoded regardless of whether any previous pictures were decoded. An open GOP is such a group of pictures in which pictures preceding the initial intra picture in output order might not be correctly decodable when the decoding starts from the initial intra picture of the open GOP. In other words, pictures of an open GOP may refer (in inter prediction) to pictures belonging to a previous GOP. An HEVC decoder can recognize an intra picture starting an open GOP, because a specific NAL unit type, CRA NAL unit type, may be used for its coded slices. A closed GOP is such a group of pictures in which all pictures can be correctly decoded when the decoding starts from the initial intra picture of the closed GOP. In other words, no picture in a closed GOP refers to any pictures in previous GOPs. In H.264/AVC and HEVC, a closed GOP may start from an IDR picture. In HEVC a closed GOP may also start from a BLA_W_RADL or a BLA_N_LP picture. An open GOP coding structure is potentially more efficient in the compression compared to a closed GOP coding structure, due to a larger flexibility in selection of reference pictures.

A Decoded Picture Buffer (DPB) may be used in the encoder and/or in the decoder. There are two reasons to buffer decoded pictures, for references in inter prediction and for reordering decoded pictures into output order. As H.264/AVC and HEVC provide a great deal of flexibility for both reference picture marking and output reordering, separate buffers for reference picture buffering and output picture buffering may waste memory resources. Hence, the DPB may include a unified decoded picture buffering process for reference pictures and output reordering. A decoded picture may be removed from the DPB when it is no longer used as a reference and is not needed for output.

Scalable video coding may refer to coding structure where one bitstream can contain multiple representations of the content, for example, at different bitrates, resolutions or frame rates. In these cases the receiver can extract the desired representation depending on its characteristics (e.g. resolution that matches best the display device). Alternatively, a server or a network element can extract the portions of the bitstream to be transmitted to the receiver depending on e.g. the network characteristics or processing capabilities of the receiver. A meaningful decoded representation can be produced by decoding only certain parts of a scalable bit stream. A scalable bitstream typically consists of a "base layer" providing the lowest quality video available and one or more enhancement layers that enhance the video quality when received and decoded together with the lower layers. In order to improve coding efficiency for the enhancement layers, the coded representation of that layer typically depends on the lower layers. E.g. the motion and mode information of the enhancement layer can be predicted from lower layers. Similarly the pixel data of the lower layers can be used to create prediction for the enhancement layer.

In some scalable video coding schemes, a video signal can be encoded into a base layer and one or more enhancement layers. An enhancement layer may enhance, for example, the temporal resolution (i.e., the frame rate), the spatial resolution, or simply the quality of the video content represented by another layer or part thereof. Each layer together with all its dependent layers is one representation of the video signal, for example, at a certain spatial resolution, temporal resolution and quality level. In this document, we refer to a scalable layer together with all of its dependent layers as a "scalable layer representation". The portion of a scalable bitstream corresponding to a scalable layer representation can be extracted and decoded to produce a representation of the original signal at certain fidelity.

Scalability modes or scalability dimensions may include but are not limited to the following:

Quality scalability: Base layer pictures are coded at a lower quality than enhancement layer pictures, which may be achieved for example using a greater quantization parameter value (i.e., a greater quantization step size for transform coefficient quantization) in the base layer than in the enhancement layer. Quality scalability may be further categorized into fine-grain or fine-granularity scalability (FGS), medium-grain or medium-granularity scalability (MGS), and/or coarse-grain or coarse-granularity scalability (CGS), as described below.

Spatial scalability: Base layer pictures are coded at a lower resolution (i.e. have fewer samples) than enhancement layer pictures. Spatial scalability and quality scalability, particularly its coarse-grain scalability type, may sometimes be considered the same type of scalability.

View scalability, which may also be referred to as multiview coding. The base layer represents a first view, whereas an enhancement layer represents a second view. A view may be defined as a sequence of pictures representing one camera or viewpoint. It may be considered that in stereoscopic or two-view video, one video sequence or view is presented for the left eye while a parallel view is presented for the right eye.

Depth scalability, which may also be referred to as depth-enhanced coding. A layer or some layers of a bitstream may represent texture view(s), while other layer or layers may represent depth view(s).

It should be understood that many of the scalability types may be combined and applied together.

The term layer may be used in context of any type of scalability, including view scalability and depth enhancements. An enhancement layer may refer to any type of an enhancement, such as SNR, spatial, multiview, and/or depth enhancement. A base layer may refer to any type of a base video sequence, such as a base view, a base layer for SNR/spatial scalability, or a texture base view for depth-enhanced video coding.

A sender, a gateway, a client, or another entity may select the transmitted layers and/or sub-layers of a scalable video bitstream. Terms layer extraction, extraction of layers, or layer down-switching may refer to transmitting fewer layers than what is available in the bitstream received by the sender, the gateway, the client, or another entity. Layer up-switching may refer to transmitting additional layer(s) compared to those transmitted prior to the layer up-switching by the sender, the gateway, the client, or another entity, i.e. restarting the transmission of one or more layers whose transmission was ceased earlier in layer down-switching. Similarly to layer down-switching and/or up-switching, the sender, the gateway, the client, or another entity may perform down- and/or up-switching of temporal sub-layers. The sender, the gateway, the client, or another entity may also perform both layer and sub-layer down-switching and/or up-switching. Layer and sub-layer down-switching and/or up-switching may be carried out in the same access unit or alike (i.e. virtually simultaneously) or may be carried out in different access units or alike (i.e. virtually at distinct times).

A scalable video encoder for quality scalability (also known as Signal-to-Noise or SNR) and/or spatial scalability may be implemented as follows. For a base layer, a conventional non-scalable video encoder and decoder may be used. The reconstructed/decoded pictures of the base layer are included in the reference picture buffer and/or reference picture lists for an enhancement layer. In case of spatial scalability, the reconstructed/decoded base-layer picture may be upsampled prior to its insertion into the reference picture lists for an enhancement-layer picture. The base layer decoded pictures may be inserted into a reference picture list(s) for coding/decoding of an enhancement layer picture similarly to the decoded reference pictures of the enhancement layer. Consequently, the encoder may choose a base-layer reference picture as an inter prediction reference and indicate its use with a reference picture index in the coded bitstream. The decoder decodes from the bitstream, for example from a reference picture index, that a base-layer picture is used as an inter prediction reference for the enhancement layer. When a decoded base-layer picture is used as the prediction reference for an enhancement layer, it is referred to as an inter-layer reference picture.

While the previous paragraph described a scalable video codec with two scalability layers with an enhancement layer and a base layer, it needs to be understood that the description can be generalized to any two layers in a scalability hierarchy with more than two layers. In this case, a second enhancement layer may depend on a first enhancement layer in encoding and/or decoding processes, and the first enhancement layer may therefore be regarded as the base layer for the encoding and/or decoding of the second enhancement layer. Furthermore, it needs to be understood that there may be inter-layer reference pictures from more than one layer in a reference picture buffer or reference picture lists of an enhancement layer, and each of these inter-layer reference pictures may be considered to reside in a base layer or a reference layer for the enhancement layer being encoded and/or decoded. Furthermore, it needs to be understood that other types of inter-layer processing than reference-layer picture upsampling may take place instead or additionally. For example, the bit-depth of the samples of the reference-layer picture may be converted to the bit-depth of the enhancement layer and/or the sample values may undergo a mapping from the color space of the reference layer to the color space of the enhancement layer.

A scalable video coding and/or decoding scheme may use multi-loop coding and/or decoding, which may be characterized as follows. In the encoding/decoding, a base layer picture may be reconstructed/decoded to be used as a motion-compensation reference picture for subsequent pictures, in coding/decoding order, within the same layer or as a reference for inter-layer (or inter-view or inter-component) prediction. The reconstructed/decoded base layer picture may be stored in the DPB. An enhancement layer picture may likewise be reconstructed/decoded to be used as a motion-compensation reference picture for subsequent pictures, in coding/decoding order, within the same layer or as reference for inter-layer (or inter-view or inter-component) prediction for higher enhancement layers, if any. In addition to reconstructed/decoded sample values, syntax element values of the base/reference layer or variables derived from the syntax element values of the base/reference layer may be used in the inter-layer/inter-component/inter-view prediction.

Inter-layer prediction may be defined as prediction in a manner that is dependent on data elements (e.g., sample values or motion vectors) of reference pictures from a different layer than the layer of the current picture (being encoded or decoded). Many types of inter-layer prediction exist and may be applied in a scalable video encoder/decoder. The available types of inter-layer prediction may for example depend on the coding profile according to which the bitstream or a particular layer within the bitstream is being encoded or, when decoding, the coding profile that the bitstream or a particular layer within the bitstream is indicated to conform to. Alternatively or additionally, the available types of inter-layer prediction may depend on the types of scalability or the type of an scalable codec or video coding standard amendment (e.g. SHVC, MV-HEVC, or 3D-HEVC) being used.

A direct reference layer may be defined as a layer that may be used for inter-layer prediction of another layer for which the layer is the direct reference layer. A direct predicted layer may be defined as a layer for which another layer is a direct reference layer. An indirect reference layer may be defined as a layer that is not a direct reference layer of a second layer but is a direct reference layer of a third layer that is a direct reference layer or indirect reference layer of a direct reference layer of the second layer for which the layer is the indirect reference layer. An indirect predicted layer may be defined as a layer for which another layer is an indirect reference layer. An independent layer may be defined as a layer that does not have direct reference layers. In other words, an independent layer is not predicted using inter-layer prediction. A non-base layer may be defined as any other layer than the base layer, and the base layer may be defined as the lowest layer in the bitstream. An independent non-base layer may be defined as a layer that is both an independent layer and a non-base layer.

Similarly to MVC, in MV-HEVC, inter-view reference pictures can be included in the reference picture list(s) of the current picture being coded or decoded. SHVC uses multi-loop decoding operation (unlike the SVC extension of H.264/AVC). SHVC may be considered to use a reference index based approach, i.e. an inter-layer reference picture can be included in a one or more reference picture lists of the current picture being coded or decoded (as described above).

For the enhancement layer coding, the concepts and coding tools of HEVC base layer may be used in SHVC, MV-HEVC, and/or alike. However, the additional inter-layer prediction tools, which employ already coded data (including reconstructed picture samples and motion parameters a.k.a motion information) in reference layer for efficiently coding an enhancement layer, may be integrated to SHVC, MV-HEVC, and/or alike codec.

A constituent picture may be defined as such part of an enclosing (de)coded picture that corresponds to a representation of an entire input picture. In addition to the constituent picture, the enclosing (de)coded picture may comprise other data, such as another constituent picture.

Frame packing may be defined to comprise arranging more than one input picture, which may be referred to as (input) constituent frames or constituent pictures, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g. by a video encoder. The bitstream may be decoded e.g. by a video decoder. The decoder or a post-processing operation after decoding may extract the decoded constituent frames from the decoded picture(s) e.g. for displaying.

Terms 360-degree video or virtual reality (VR) video may be used interchangeably. They may generally refer to video content that provides such a large field of view that only a part of the video is displayed at a single point of time in typical displaying arrangements. For example, VR video may be viewed on a head-mounted display (HMD) that may be capable of displaying e.g. about 100-degree field of view. The spatial subset of the VR video content to be displayed may be selected based on the orientation of the HMD. In another example, a typical flat-panel viewing environment is assumed, wherein e.g. up to 40-degree field-of-view may be displayed. When displaying wide-FOV content (e.g. fisheye) on such a display, it may be preferred to display a spatial subset rather than the entire picture.

MPEG Omnidirectional Media Format (ISO/IEC 23090-2) is a virtual reality (VR) system standard. OMAF defines a media format (comprising both file format derived from ISOBMFF and streaming formats for DASH and MPEG Media Transport). OMAF version 1 supports 360° video, images, and audio, as well as the associated timed text and facilitates three degrees of freedom (3DoF) content consumption, meaning that a viewport can be selected with any azimuth and elevation range and tilt angle that are covered by the omnidirectional content but the content is not adapted to any translational changes of the viewing position. The viewport-dependent streaming scenarios described further below have also been designed for 3DoF although could potentially be adapted to a different number of degrees of freedom.

Standardization of OMAF version 2 is ongoing. OMAF v2 is planned to include features like support for multiple viewpoints, overlays, sub-picture compositions, and six degrees of freedom with a viewing space limited roughly to upper-body movements only.

A viewpoint may be defined as the point or space from which the user views the scene; it usually corresponds to a camera position. Slight head motion does not imply a different viewpoint. A viewing position may be defined as the position within a viewing space from which the user views the scene. A viewing space may be defined as a 3D space of viewing positions within which rendering of image and video is enabled and VR experience is valid.

Figure 5:
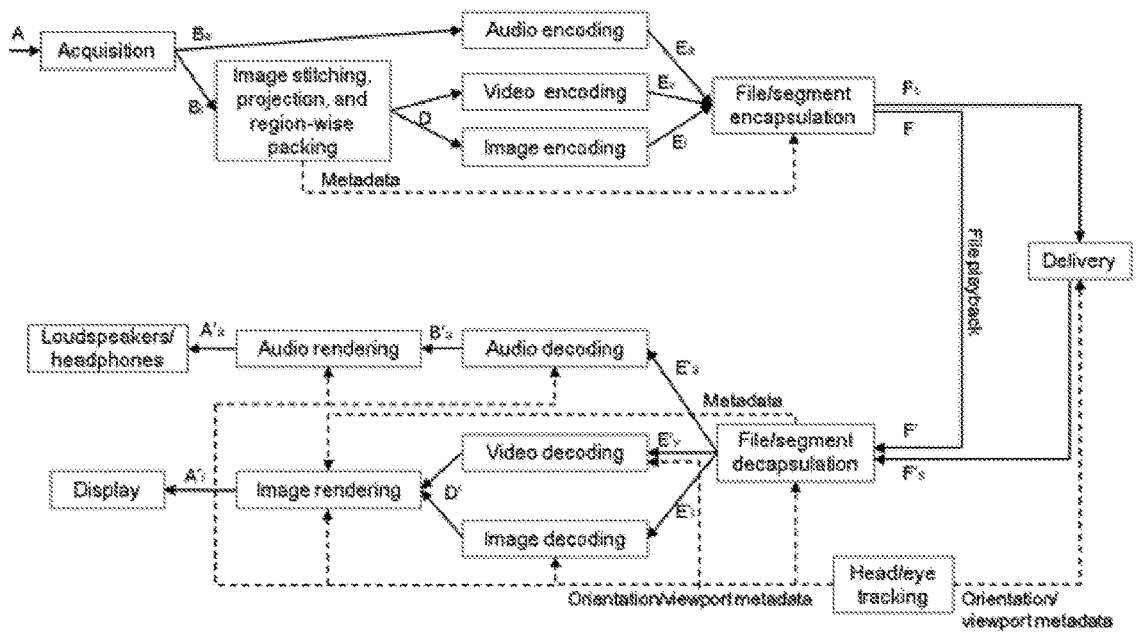
FIG. 5 shows an example of MPEG Omnidirectional Media Format (OMAF) concept.

MPEG Omnidirectional Media Format (OMAF) is described in the following by referring to FIG. 5. A real-world audio-visual scene (A) is captured by audio sensors as well as a set of cameras or a camera device with multiple lenses and sensors. The acquisition results in a set of digital image/video (Bi) and audio (Ba) signals. The cameras/lenses typically cover all directions around the center point of the camera set or camera device, thus the name of 360-degree video.

Audio can be captured using many different microphone configurations and stored as several different content formats, including channel-based signals, static or dynamic (i.e. moving through the 3D scene) object signals, and scene-based signals (e.g., Higher Order Ambisonics). The channel-based signals typically conform to one of the loudspeaker layouts defined in CICP. In an omnidirectional media application, the loudspeaker layout signals of the rendered immersive audio program are binaraulized for presentation via headphones.

The images (Bi) of the same time instance are stitched, projected, and mapped onto a packed picture (D).

Figure 6A:
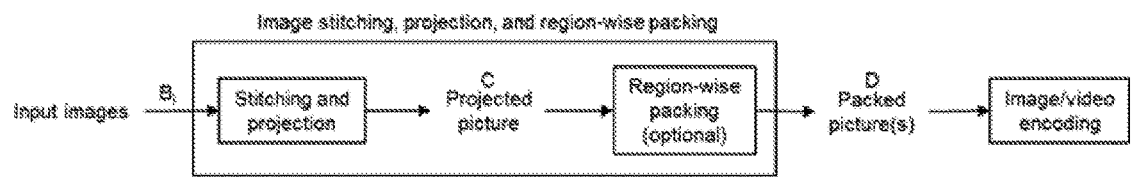
FIGS. 6a and 6b show two alternative methods for packing 360-degree video content into 2D packed pictures for encoding.

For monoscopic 360-degree video, the input images of one time instance are stitched to generate a projected picture representing one view. The breakdown of image stitching, projection, and region-wise packing process for monoscopic content is illustrated with FIG. 6a and described as follows. Input images (Bi) are stitched and projected onto a three-dimensional projection structure that may for example be a unit sphere. The projection structure may be considered to comprise one or more surfaces, such as plane(s) or part(s) thereof. A projection structure may be defined as three-dimensional structure consisting of one or more surface(s) on which the captured VR image/video content is projected, and from which a respective projected picture can be formed. The image data on the projection structure is further arranged onto a two-dimensional projected picture (C). The term projection may be defined as a process by which a set of input images are projected onto a projected frame. There may be a pre-defined set of representation formats of the projected picture, including for example an equirectangular projection (ERP) format and a cube map projection (CMP) format. It may be considered that the projected picture covers the entire sphere.

Optionally, region-wise packing is then applied to map the projected picture onto a packed picture. If the region-wise packing is not applied, the packed picture is identical to the projected picture, and this picture is given as input to image/video encoding. Otherwise, regions of the projected picture are mapped onto a packed picture (D) by indicating the location, shape, and size of each region in the packed picture, and the packed picture (D) is given as input to image/video encoding. The term region-wise packing may be defined as a process by which a projected picture is mapped to a packed picture. The term packed picture may be defined as a picture that results from region-wise packing of a projected picture.

In the case of stereoscopic 360-degree video, the input images of one time instance are stitched to generate a projected picture representing two views, one for each eye. Both views can be mapped onto the same packed picture, as described below in relation to the FIG. 6b, and encoded by a traditional 2D video encoder. Alternatively, each view of the projected picture can be mapped to its own packed picture, in which case the image stitching, projection, and region-wise packing is like described above with the FIG. 6a. A sequence of packed pictures of either the left view or the right view can be independently coded or, when using a multiview video encoder, predicted from the other view.

Figure 6B:
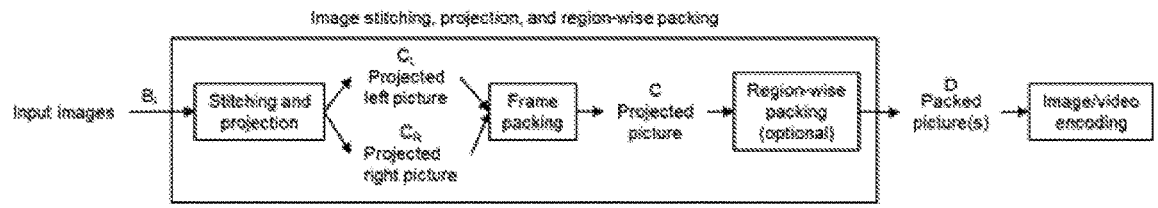

The breakdown of image stitching, projection, and region-wise packing process for stereoscopic content where both views are mapped onto the same packed picture is illustrated with the FIG. 6b and described as follows. Input images (Bi) are stitched and projected onto two three-dimensional projection structures, one for each eye. The image data on each projection structure is further arranged onto a two-dimensional projected picture ($C_L$ for left eye, $C_R$ for right eye), which covers the entire sphere. Frame packing is applied to pack the left view picture and right view picture onto the same projected picture. Optionally, region-wise packing is then applied to the pack projected picture onto a packed picture, and the packed picture (D) is given as input to image/video encoding. If the region-wise packing is not applied, the packed picture is identical to the projected picture, and this picture is given as input to image/video encoding.

The image stitching, projection, and region-wise packing process can be carried out multiple times for the same source images to create different versions of the same content, e.g. for different orientations of the projection structure. Similarly, the region-wise packing process can be performed multiple times from the same projected picture to create more than one sequence of packed pictures to be encoded.

Figure 7:
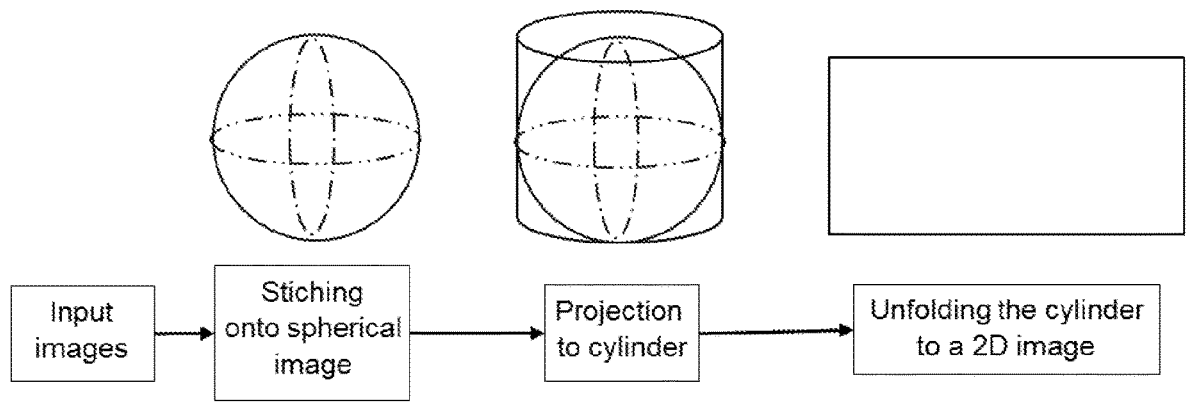
FIG. 7 shows a process of forming a monoscopic equirectangular panorama picture.

360-degree panoramic content (i.e., images and video) cover horizontally the full 360-degree field-of-view around the capturing position of an imaging device. The vertical field-of-view may vary and can be e.g. 180 degrees. Panoramic image covering 360-degree field-of-view horizontally and 180-degree field-of-view vertically can be represented by a sphere that can be mapped to a bounding cylinder that can be cut vertically to form a 2D picture (this type of projection is known as equirectangular projection). The process of forming a monoscopic equirectangular panorama picture is illustrated in FIG. 7. A set of input images, such as fisheye images of a camera array or a camera device with multiple lenses and sensors, is stitched onto a spherical image. The spherical image is further projected onto a cylinder (without the top and bottom faces). The cylinder is unfolded to form a two-dimensional projected frame. In practice one or more of the presented steps may be merged; for example, the input images may be directly projected onto a cylinder without an intermediate projection onto a sphere. The projection structure for equirectangular panorama may be considered to be a cylinder that comprises a single surface.

In general, 360-degree content can be mapped onto different types of solid geometrical structures, such as polyhedron (i.e. a three-dimensional solid object containing flat polygonal faces, straight edges and sharp corners or vertices, e.g., a cube or a pyramid), cylinder (by projecting a spherical image onto the cylinder, as described above with the equirectangular projection), cylinder (directly without projecting onto a sphere first), cone, etc. and then unwrapped to a two-dimensional image plane.

In some cases panoramic content with 360-degree horizontal field-of-view but with less than 180-degree vertical field-of-view may be considered special cases of panoramic projection, where the polar areas of the sphere have not been mapped onto the two-dimensional image plane. In some cases a panoramic image may have less than 360-degree horizontal field-of-view and up to 180-degree vertical field-of-view, while otherwise has the characteristics of panoramic projection format.

Region-wise packing information may be encoded as metadata in or along the bitstream. For example, the packing information may comprise a region-wise mapping from a pre-defined or indicated source format to the packed frame format, e.g. from a projected picture to a packed picture, as described earlier.

Rectangular region-wise packing metadata is described next: For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

Among others, region-wise packing provides signalling for the following usage scenarios:
Additional compression for viewport-independent projections is achieved by densifying sampling of different regions to achieve more uniformity across the sphere. For example, the top and bottom parts of ERP are oversampled, and region-wise packing can be applied to down-sample them horizontally.
Arranging the faces of plane-based projection formats, such as cube map projection, in an adaptive manner.
Generating viewport-dependent bitstreams that use viewport-independent projection formats. For example, regions of ERP or faces of CMP can have different sampling densities and the underlying projection structure can have different orientations.
Indicating regions of the packed pictures represented by an extractor track. This is needed when an extractor track collects tiles from bitstreams of different resolutions.

OMAF allows the omission of image stitching, projection, and region-wise packing and encode the image/video data in their captured format. In this case, images D are considered the same as images Bi and a limited number of fisheye images per time instance are encoded.

For audio, the stitching process is not needed, since the captured signals are inherently immersive and omnidirectional.

The stitched images (D) are encoded as coded images (Ei) or a coded video bitstream (Ev). The captured audio (Ba) is encoded as an audio bitstream (Ea). The coded images, video, and/or audio are then composed into a media file for file playback (F) or a sequence of an initialization segment and media segments for streaming (Fs), according to a particular media container file format. In this specification, the media container file format is the ISO base media file format. The file encapsulator also includes metadata into the file or the segments, such as projection and region-wise packing information assisting in rendering the decoded packed pictures.

The metadata in the file may include:
the projection format of the projected picture,
fisheye video parameters,
the area of the spherical surface covered by the packed picture,
the orientation of the projection structure corresponding to the projected picture relative to the global coordinate axes,
region-wise packing information, and
region-wise quality ranking (optional).

The segments Fs are delivered using a delivery mechanism to a player.

The file that the file encapsulator outputs (F) is identical to the file that the file decapsulator inputs (F'). A file decapsulator processes the file (F') or the received segments (F's) and extracts the coded bitstreams (E'a, E'v, and/or E'i) and parses the metadata. The audio, video, and/or images are then decoded into decoded signals (B'a for audio, and D' for images/video). The decoded packed pictures (D') are projected onto the screen of a head-mounted display or any other display device based on the current viewing orientation or viewport and the projection, spherical coverage, projection structure orientation, and region-wise packing metadata parsed from the file. Likewise, decoded audio (B'a) is rendered, e.g. through headphones, according to the current viewing orientation. The current viewing orientation is determined by the head tracking and possibly also eye tracking functionality. Besides being used by the renderer to render the appropriate part of decoded video and audio signals, the current viewing orientation may also be used the video and audio decoders for decoding optimization.

The process described above is applicable to both live and on-demand use cases.

The human eyes are not capable of viewing the whole 360 degrees space, but are limited to a maximum horizontal and vertical FoVs (HHFoV, HVFoV). Also, a HMD device has technical limitations that allow only viewing a subset of the whole 360 degrees space in horizontal and vertical directions (DHFoV, DVFoV)).

At any point of time, a video rendered by an application on a HMD renders a portion of the 360 degrees video. This portion is defined here as viewport. A viewport is a window on the 360 world represented in the omnidirectional video displayed via a rendering display. A viewport may alternatively be defined as a region of omnidirectional image or video suitable for display and viewing by the user.

A viewport size may correspond to the field of view of the HMD or may have a smaller size, depending on the application. For the sake of clarity, we define as primary viewport the part of the 360 degrees space viewed by a user at any given point of time.

Figure 8:
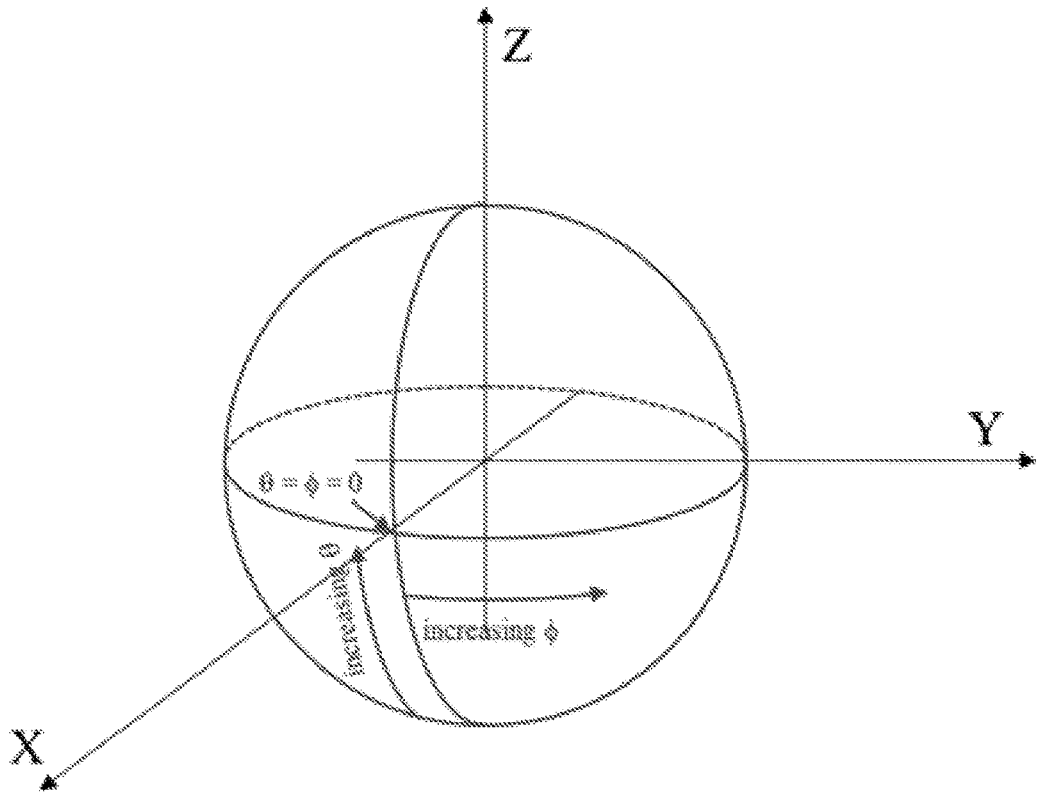
FIG. 8 shows an example of OMAF's coordinate system.

The coordinate system of OMAF consists of a unit sphere and three coordinate axes, namely the X (back-to-front) axis, the Y (lateral, side-to-side) axis, and the Z (vertical, up) axis, where the three axes cross at the centre of the sphere. The location of a point on the sphere is identified by a pair of sphere coordinates azimuth ($\phi$) and elevation ($\theta$). FIG. 8 specifies the relation of the sphere coordinates azimuth ($\phi$) and elevation ($\theta$) to the X, Y, and Z coordinate axes.

A viewing orientation may be defined as triplet of azimuth, elevation, and tilt angle characterizing the orientation that a user is consuming the audio-visual content; in case of image or video, characterizing the orientation of the viewport.

Figure 9:
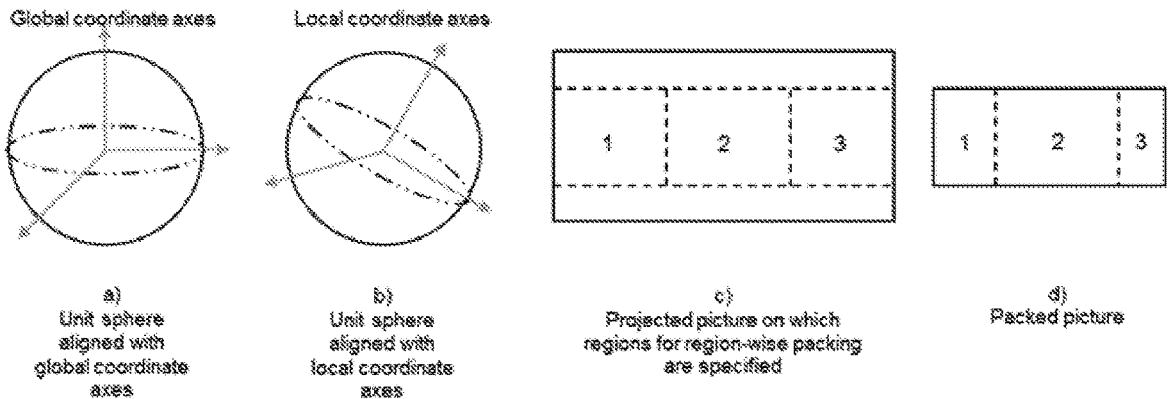
FIG. 9 shows an example of converting a spherical picture into a packed 2D picture.

FIG. 9 illustrates the conversions from a spherical picture to a packed picture that could be used in content authoring and the corresponding conversions from a packed picture to a spherical picture to be rendered that could be used in an OMAF player. The example in this clause is described for a packed picture that appears in a projected omnidirectional video track. Similar description could be derived for an image item.

The content authoring could include the following ordered steps:
  The source images provided as input are stitched to generate a sphere picture on the unit sphere per the global coordinate axes as indicated in a).
  The unit sphere is then rotated relative to the global coordinate axes, as indicated in b). The amount of rotation to convert from the local coordinate axes to the global coordinate axes is specified by the rotation angles indicated in the RotationBox. The local coordinate axes of the unit sphere are the axes of the coordinate system that has been rotated. The absence of RotationBox indicates that the local coordinate axes are the same as the global coordinate axes.
  As illustrated in c), the spherical picture on the rotated unit sphere is then converted to a two-dimensional projected picture, for example using the equirectangular projection. When spatial packing of stereoscopic content is applied, two spherical pictures for the two views are converted to two constituent pictures, after which frame packing is applied to pack the two constituent pictures to one projected picture.
  Rectangular region-wise packing could be applied to obtain a packed picture from the projected picture. One example of packing is depicted in c) and d). The dashed rectangles in c) indicate the projected regions on a projected picture, and the respective areas in d) indicate the corresponding packed regions. In this example, projected regions 1 and 3 are horizontally downsampled, while projected region 2 is kept at its original resolution.

CoverageInformationBox could be used to indicate content coverage, i.e., which part of the sphere is covered by the packed picture.

In order to map sample locations of a packed picture, such as that in d), to a unit sphere used in rendering illustrated in a), the OMAF player could perform the following ordered steps:
  A packed picture, such as that in d), is obtained as a result of decoding a picture from a video track or an image item.
  If needed, chroma sample arrays of the packed picture are upsampled to the resolution of the luma sample array of the packed picture, and colour space conversion could also be performed.
  If region-wise packing is indicated, the sample locations of the packed picture are converted to sample locations of the respective projected picture, such as that in c). Otherwise, the projected picture is identical to the packed picture.
  If spatial frame packing of the projected picture is indicated, the sample locations of the projected picture are converted to sample locations of the respective constituent picture of the projected picture. Otherwise, the constituent picture of the projected picture is identical to the projected picture.
  The sample locations of a constituent picture the projected picture are converted to sphere coordinates that are relative to local coordinate axes, as specified for the omnidirectional projection format being used. The resulting sample locations correspond to a sphere picture depicted in b).
  If rotation is indicated, the sphere coordinates relative to the local coordinate axes are converted to sphere coordinates relative to the global coordinate axes. Otherwise, the global coordinate axes are identical to the local coordinate axes.

For signaling the metadata of tile or sub-picture tracks or alike, any known method may be used. For example, a region-wise packing box and/or a 2D or spherical region-wise quality ranking box may be present for each tile or sub-picture track of 360° video. In another example, metadata may be present for each tile or sub-picture track of volumetric video.

Region-wise quality ranking metadata may be present in or along a video or image bitstream. Quality ranking values of quality ranking regions may be relative to other quality ranking regions of the same bitstream or the same track or quality ranking regions of other tracks. Region-wise quality ranking metadata can be indicated for example by using the SphereRegionQualityRankingBox or the 2DRegionQualityRankingBox, which are specified as a part of MPEG Omnidirectional Media Format. SphereRegionQualityRankingBox provides quality ranking values for sphere regions, i.e., regions defined on sphere domain, while 2DRegionQualityRankingBox provides quality ranking values for rectangular regions on decoded pictures (and potentially a leftover region covering all areas not covered by any of the rectangular regions). Quality ranking values indicate a relative quality order of quality ranking regions. When quality ranking region A has a non-zero quality ranking value less than that of quality ranking region B, quality ranking region A has a higher quality than quality ranking region B. When the quality ranking value is non-zero, the picture quality within the entire indicated quality ranking region may be defined to be approximately constant. In general, the boundaries of the quality ranking sphere or 2D regions may or may not match with the boundaries of the packed regions or the boundaries of the projected regions specified in region-wise packing metadata.

Extractors specified in ISO/IEC 14496-15 for H.264/AVC and HEVC enable compact formation of tracks that extract NAL unit data by reference. An extractor is a NAL-unit-like structure. A NAL-unit-like structure may be specified to comprise a NAL unit header and NAL unit payload like any NAL units, but start code emulation prevention (that is required for a NAL unit) might not be followed in a NAL-unit-like structure. For HEVC, an extractor contains one or more constructors. A sample constructor extracts, by reference, NAL unit data from a sample of another track. An in-line constructor includes NAL unit data. When an extractor is processed by a file reader that requires it, the extractor is logically replaced by the bytes resulting when resolving the contained constructors in their appearance order. Nested extraction may be disallowed, e.g. the bytes referred to by a sample constructor shall not contain extractors; an extractor shall not reference, directly or indirectly, another extractor. An extractor may contain one or more constructors for extracting data from the current track or from another track that is linked to the track in which the extractor resides by means of a track reference of type 'scal'.

The bytes of a resolved extractor are one of the following:
a) One entire NAL unit; note that when an Aggregator is referenced, both the included and referenced bytes are copied
b) More than one entire NAL unit In both cases the bytes of the resolved extractor start with a valid length field and a NAL unit header.

The bytes of a sample constructor are copied only from the single identified sample in the track referenced through the indicated 'scal' track reference. The alignment is on decoding time, i.e. using the time-to-sample table only, followed by a counted offset in sample number. Extractors are a media-level concept and hence apply to the destination track before any edit list is considered. (However, one would normally expect that the edit lists in the two tracks would be identical).

The following syntax may be used:

```
class aligned(8) Extractor ( ) {
   NALUnitHeader( );
   do {
      unsigned int(8) constructor_type;
      if( constructor_type == 0 )
         SampleConstructor( );
      else if( constructor_type == 2 )
         InlineConstructor( );
   } while( !EndOfNALUnit( ) )
}
```

The semantics may be defined as follows:
NALUnitHeader( ): The first two bytes of HEVC NAL units. A particular nal_unit_type value indicates an extractor, e.g. nal_unit_type equal to 49.

constructor_type specifies the constructor being used.
EndOfNALUnit( ) is a function that returns 0 (false) when more data follows in this extractor; otherwise it returns 1 (true).

The sample constructor (SampleConstructor) may have the following syntax:

```
class aligned(8) SampleConstructor ( ) {
   unsigned int(8) track_ref_index;
   signed   int(8) sample_offset;
   unsigned int((lengthSizeMinusOne+1)*8)
      data_offset;
   unsigned int((lengthSizeMinusOne+1)*8)
      data_length;
}
``` track_ref_index identifies the source track from which data is extracted. track_ref_index is the index of the track reference of type 'scal'. The first track reference has the index value 1; the value 0 is reserved.

The sample in that track from which data is extracted is temporally aligned or nearest preceding in the media decoding timeline, i.e. using the time-to-sample table only, adjusted by an offset specified by sample_offset with the sample containing the extractor. sample_offset gives the relative index of the sample in the linked track that shall be used as the source of information. Sample 0 (zero) is the sample with the same, or the closest preceding, decoding time compared to the decoding time of the sample containing the extractor; sample 1 (one) is the next sample, sample −1 (minus 1) is the previous sample, and so on.

data_offset: The offset of the first byte within the reference sample to copy. If the extraction starts with the first byte of data in that sample, the offset takes the value 0.

data_length: The number of bytes to copy.

The syntax of the in-line constructor may be specified as follows:

```
class aligned(8) InlineConstructor ( ) {
   unsigned int(8) length;
   unsigned int(8) inline_data[length];
}
``` length: the number of bytes that belong to the InlineConstructor following this field.
inline_data: the data bytes to be returned when resolving the in-line constructor.

A tile track specified in ISO/IEC 14496-15 enables storage of one or more temporal motion-constrained tile set as a track. When a tile track contains tiles of an HEVC base layer, the sample entry type 'hvt1' is used. When a tile track contains tiles of a non-base layer, the sample entry type 'lht1' is used. A sample of a tile track consists of one or more complete tiles in one or more complete slice segments. A tile track is independent from any other tile track that includes VCL NAL units of the same layer as this tile track. A tile track has a 'tbas' track reference to a tile base track. The tile base track does not include VCL NAL units. A tile base track indicates the tile ordering using a 'sabt' track reference to the tile tracks. An HEVC coded picture corresponding to a sample in the tile base track can be reconstructed by collecting the coded data from the time-aligned samples of the tracks indicated by the 'sabt' track reference in the order of the track references. It can therefore be understood that a tile base track includes coded video data of the referenced tile tracks by reference.

A sub-picture may be defined as a picture that represents a spatial subset of the original video content, which has been split into spatial subsets before video encoding at the content production side. A sub-picture bitstream may be defined as a bitstream that represents a spatial subset of the original video content, which has been split into spatial subsets before video encoding at the content production side. A sub-picture track may be defined as a track that is with spatial relationships to other track(s) originating from the same original video content and that represents a sub-picture bitstream. A sub-picture track conforms to the a conventional track format, such as 'hvc1' or 'hev1' defined for HEVC in ISO/IEC 14496-15. In an approach to generate sub-picture tracks, a source picture sequence is split into sub-picture sequences before encoding. A sub-picture sequence is then encoded independently from other sub-picture sequences as a single-layer bitstream, such as HEVC Main profile bitstream. The coded single-layer bitstream is encapsulated into a sub-picture track. The bitstream for a sub-picture track may be encoded with motion-constrained pictures, as defined later. In another approach to generate sub-picture tracks, a source picture sequence is encoded with motion-constrained tile sets into a bitstream, an MCTS sequence is extracted from the bitstream, and a sub-picture track is generated by converting the MCTS sequence into a conforming bitstream e.g. through slice header modifications and encapsulating the generated bitstream into a track. Sub-picture tracks generated this way comprise motion-constrained pictures.

A collector track may be defined as a track that extracts implicitly or explicitly MCTSs or sub-pictures from other tracks. When resolved by a file reader, a collector track may represent a bitstream conforming to a video codec specification, such a HEVC or H.266/VVC. A collector track may for example extract MCTSs or sub-pictures to form a coded picture sequence where MCTSs or sub-pictures are arranged to a grid. For example, when a collector track extracts two MCTSs or sub-pictures, they may be arranged into a 2×1 grid of MCTSs or sub-pictures. A tile base track may be regarded as a collector track, and an extractor track that extracts MCTSs or sub-pictures from other tracks may be regarded as a collector track. A collector track may also be referred to as a collection track. A track that is a source for extracting to a collector track may be referred to as a collection item track.

To avoid creating an excessive number of extractor tracks (e.g., to avoid creating an extractor track for each combination of high-resolution and low-resolution tiles), tracks that are alternatives for extraction may be grouped with a mechanism described in the following. Likewise, to enable the use of the same tile base track for collocated tile tracks representing different bitrate versions of the same content, the following mechanism may be used.

A file writer indicates in a file that a track group, e.g. referred to as 'alte' track group, contains tracks that are alternatives to be used as a source for extraction.

The identifier for the 'alte' group may be taken from the same numbering space as the identifier for tracks. In other words, the identifier for the 'alte' group may be required to differ from all the track identifier values. Consequently, the 'alte' track group identifier may be used in places where track identifier is conventionally used. Specifically, the 'alte' track group identifier may be used as a track reference indicating the source for extraction.

Members of the track group formed by this box are alternatives to be used as a source for extraction. Members of the track group with track_group_type equal to 'alte' are alternatives to be used as a source for 'scal' or 'sabt' track reference. A TrackReferenceTypeBox of reference_type equal to track_ref_4cc may list the track_group_id value(s) of an 'alte' track group(s) of containing the same alte_track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. The source track for extraction may be changed at a position where the track switched to has a sync sample or a SAP sample of type 1 or 2.

A uniform resource identifier (URI) may be defined as a string of characters used to identify a name of a resource. Such identification enables interaction with representations of the resource over a network, using specific protocols. A URI is defined through a scheme specifying a concrete syntax and associated protocol for the URI. The uniform resource locator (URL) and the uniform resource name (URN) are forms of URI. A URL may be defined as a URI that identifies a web resource and specifies the means of acting upon or obtaining the representation of the resource, specifying both its primary access mechanism and network location. A URN may be defined as a URI that identifies a resource by name in a particular namespace. A URN may be used for identifying a resource without implying its location or how to access it.

Many video communication or transmission systems, transport mechanisms, and multimedia container file formats provide means to associate coded data of separate logical channels, such as of different tracks or sessions, with each other. For example, there are mechanisms to associate coded data of the same access unit together. For example, decoding or output times may be provided in the container file format or transport mechanism, and coded data with the same decoding or output time may be considered to form an access unit.

Recently, Hypertext Transfer Protocol (HTTP) has been widely used for the delivery of real-time multimedia content over the Internet, such as in video streaming applications. Unlike the use of the Real-time Transport Protocol (RTP) over the User Datagram Protocol (UDP), HTTP is easy to configure and is typically granted traversal of firewalls and network address translators (NAT), which makes it attractive for multimedia streaming applications.

Several commercial solutions for adaptive streaming over HTTP, such as Microsoft® Smooth Streaming, Apple® Adaptive HTTP Live Streaming and Adobe® Dynamic Streaming, have been launched as well as standardization projects have been carried out. Adaptive HTTP streaming (AHS) was first standardized in Release 9 of 3rd Generation Partnership Project (3GPP) packet-switched streaming (PSS) service (3GPP TS 26.234 Release 9: "Transparent end-to-end packet-switched streaming service (PSS); protocols and codecs"). MPEG took 3GPP AHS Release 9 as a starting point for the MPEG DASH standard (ISO/IEC 23009-1: "Dynamic adaptive streaming over HTTP (DASH)-Part 1: Media presentation description and segment formats," International Standard, $2^{nd}$ Edition, 2014). 3GPP continued to work on adaptive HTTP streaming in communication with MPEG and published 3GP-DASH (Dynamic Adaptive Streaming over HTTP; 3GPP TS 26.247: "Transparent end-to-end packet-switched streaming Service (PSS); Progressive download and dynamic adaptive Streaming over HTTP (3GP-DASH)". MPEG DASH and 3GP-DASH are technically close to each other and may therefore be collectively referred to as DASH. Streaming systems similar to MPEG-DASH include for example HTTP Live Streaming (a.k.a. HLS), specified in the IETF RFC 8216. For a detailed description of said adaptive streaming system, all providing examples of a video streaming system, wherein the embodiments may be implemented, a reference is made to the above standard documents. The aspects of the invention are not limited to the above standard documents but rather the description is given for one possible basis on top of which the invention may be partly or fully realized.

In DASH, the multimedia content may be stored on an HTTP server and may be delivered using HTTP. The content may be stored on the server in two parts: Media Presentation Description (MPD), which describes a manifest of the available content, its various alternatives, their URL addresses, and other characteristics; and segments, which contain the actual multimedia bitstreams in the form of chunks, in a single or multiple files. The MDP provides the necessary information for clients to establish a dynamic adaptive streaming over HTTP. The MPD contains information describing media presentation, such as an HTTP-uniform resource locator (URL) of each Segment to make GET Segment request. To play the content, the DASH client may obtain the MPD e.g. by using HTTP, email, thumb drive, broadcast, or other transport methods. By parsing the MPD, the DASH client may become aware of the program timing, media-content availability, media types, resolutions, minimum and maximum bandwidths, and the existence of various encoded alternatives of multimedia components, accessibility features and required digital rights management (DRM), media-component locations on the network, and other content characteristics. Using this information, the DASH client may select the appropriate encoded alternative and start streaming the content by fetching the segments using e.g. HTTP GET requests. After appropriate buffering to allow for network throughput variations, the client may continue fetching the subsequent segments and also monitor the network bandwidth fluctuations. The client may decide how to adapt to the available bandwidth by fetching segments of different alternatives (with lower or higher bitrates) to maintain an adequate buffer.

In the context of DASH, the following definitions may be used: A media content component or a media component may be defined as one continuous component of the media content with an assigned media component type that can be encoded individually into a media stream. Media content may be defined as one media content period or a contiguous sequence of media content periods. Media content component type may be defined as a single type of media content such as audio, video, or text. A media stream may be defined as an encoded version of a media content component.

In DASH, a hierarchical data model is used to structure media presentation as follows. A media presentation consists of a sequence of one or more Periods, each Period contains one or more Groups, each Group contains one or more Adaptation Sets, each Adaptation Sets contains one or more Representations, each Representation consists of one or more Segments. A Group may be defined as a collection of Adaptation Sets that are not expected to be presented simultaneously. An Adaptation Set may be defined as a set of interchangeable encoded versions of one or several media content components. A Representation is one of the alternative choices of the media content or a subset thereof typically differing by the encoding choice, e.g. by bitrate, resolution, language, codec, etc. The Segment contains certain duration of media data, and metadata to decode and present the included media content. A Segment is identified by a URI and can typically be requested by a HTTP GET request. A Segment may be defined as a unit of data associated with an HTTP-URL and optionally a byte range that are specified by an MPD.

An Initialization Segment may be defined as a Segment containing metadata that is necessary to present the media streams encapsulated in Media Segments. In ISOBMFF based segment formats, an Initialization Segment may comprise the Movie Box ('moov') which might not include metadata for any samples, i.e. any metadata for samples is provided in 'moof' boxes.

A Media Segment contains certain duration of media data for playback at a normal speed, such duration is referred as Media Segment duration or Segment duration. The content producer or service provider may select the Segment duration according to the desired characteristics of the service. For example, a relatively short Segment duration may be used in a live service to achieve a short end-to-end latency. The reason is that Segment duration is typically a lower bound on the end-to-end latency perceived by a DASH client since a Segment is a discrete unit of generating media data for DASH. Content generation is typically done such a manner that a whole Segment of media data is made available for a server. Furthermore, many client implementations use a Segment as the unit for GET requests. Thus, in typical arrangements for live services a Segment can be requested by a DASH client only when the whole duration of Media Segment is available as well as encoded and encapsulated into a Segment. For on-demand service, different strategies of selecting Segment duration may be used.

A Segment may be further partitioned into Subsegments e.g. to enable downloading segments in multiple parts. Subsegments may be required to contain complete access units. Subsegments may be indexed by Segment Index box, which contains information to map presentation time range and byte range for each Subsegment. The Segment Index box may also describe subsegments and stream access points in the segment by signaling their durations and byte offsets. A DASH client may use the information obtained from Segment Index box(es) to make a HTTP GET request for a specific Subsegment using byte range HTTP request. If relatively long Segment duration is used, then Subsegments may be used to keep the size of HTTP responses reasonable and flexible for bitrate adaptation. The indexing information of a segment may be put in the single box at the beginning of that segment, or spread among many indexing boxes in the segment. Different methods of spreading are possible, such as hierarchical, daisy chain, and hybrid. This technique may avoid adding a large box at the beginning of the segment and therefore may prevent a possible initial download delay.

As explained above, DASH and other similar streaming systems provide a protocol and/or formats for multimedia streaming applications. A recent trend in streaming in order to reduce the streaming bitrate of VR video may be referred to as viewport dependent delivery and it can be explained as follows: a subset of 360-degree video content covering the primary viewport (i.e., the current view orientation) is transmitted at the best quality/resolution, while the remaining of 360-degree video is transmitted at a lower quality/resolution.

Viewport-adaptive streaming may be realized through a tile-based encoding and streaming approaches. In these approaches, 360-degree content is encoded and made available in a manner that enables selective streaming of viewports from different encodings.

In viewport-specific encoding/packing, 360-degree image content is packed into the same frame with an emphasis (e.g.

greater spatial area) on the primary viewport. Several versions of the content are created for different primary viewport orientations and/or FOVs. Viewport-specific encoding/packing may be achieved through asymmetric projection (a.k.a. viewport-dependent projection), wherein the viewport area is encoded in the highest sampling density, and the rest of the 360 scene is projected in a way that the sampling density is gradually decreasing from the viewport to non-viewport areas. The re-projected non-viewport area is packed into the same image plane as the viewport area. In a region-wise mixed quality approach, the viewport area is encoded with the highest picture quality, while the other areas are encoded with lower quality. In a region-wise mixed resolution approach, a viewport-independent projection is applied and the projected 2D picture is resampled region-wise prior to its encoding in a manner that the viewport originates from the highest 2D resolution and other areas originate from lower 2D resolutions.

In tile-based viewport-dependent streaming approaches, projected pictures are partitioned into tiles that are coded as motion-constrained tile sets (MCTSs). Tile-based viewport-adaptive streaming schemes can be categorized as follows:

Region-wise mixed quality (RWMQ) 360° video: Several versions of the content are encoded using MCTSs on the same tile grid, each version with different bitrate and picture quality. Players select on MCTS basis which version is received so that the quality of the MCTSs covering the viewport is higher than that of the other received MCTSs.

Viewport+360° video: MCTSs for a complete low-resolution omnidirectional picture and high-resolution tiles covering the viewport are received.

Region-wise mixed resolution (RWMR) 360° video: Tiles are encoded at multiple resolutions. Players select a combination of high resolution tiles covering the viewport and low-resolution tiles for the remaining areas.

It is noted that all these approaches can be applied regardless of whether client-driven bitstream rewriting or extractor-driven sub-picture merging is in use. Further, in all these approaches, tiles (or their guard bands) may overlap by an amount selected in the pre-processing or encoding.

All above-described viewport-dependent streaming approaches may be realized with client-driven bitstream rewriting (a.k.a. late binding) or with author-driven MCTS merging (a.k.a. early binding). In late binding, a player selects MCTS sequences to be received, selectively rewrites portions of the received video data as necessary (e.g. parameter sets and slice segment headers may need to be rewritten) for combining the received MCTSs into a single bitstream, and decodes the single bitstream. Early binding refers to the use of author-driven information for rewriting portions of the received video data as necessary, for merging of MCTSs into a single bitstream to be decoded, and in some cases for selection of MCTS sequences to be received. There may be approaches in between early and late binding: for example, it may be possible to let players select MCTS sequences to be received without author guidance, while an author-driven approach is used for MCTS merging and header rewriting. Early binding approaches include an extractor-driven approach and tile track approach, which are described subsequently.

In the tile track approach, one or more motion-constrained tile set sequences are extracted from a bitstream, and each extracted motion-constrained tile set sequence is stored as a tile track (e.g. an HEVC tile track) in a file. A tile base track (e.g. an HEVC tile base track) may be generated and stored in a file. The tile base track represents the bitstream by implicitly collecting motion-constrained tile sets from the tile tracks. At the receiver side the tile tracks to be streamed may be selected based on the viewing orientation. The client may receive tile tracks covering the entire omnidirectional content. Better quality or higher resolution tile tracks may be received for the current viewport compared to the quality or resolution covering the remaining 360-degree video. A tile base track may include track references to the tile tracks, and/or tile tracks may include track references to the tile base track. For example, in HEVC, the 'sabt' track reference is used used to refer to tile tracks from a tile base track, and the tile ordering is indicated by the order of the tile tracks contained by a 'sabt' track reference. Furthermore, in HEVC, a tile track has a 'tbas' track reference to the tile base track.

In the extractor-driven approach, one or more motion-constrained tile set sequences are extracted from a bitstream, and each extracted motion-constrained tile set sequence is modified to become a compliant bitstream of its own (e.g. HEVC bitstream) and stored as a sub-picture track (e.g. with untransformed sample entry type 'hvc1' for HEVC) in a file. One or more extractor tracks (e.g. an HEVC extractor tracks) may be generated and stored in a file. The extractor track represents the bitstream by explicitly extracting (e.g. by HEVC extractors) motion-constrained tile sets from the sub-picture tracks. At the receiver side the sub-picture tracks to be streamed may be selected based on the viewing orientation. The client may receive sub-picture tracks covering the entire omnidirectional content. Better quality or higher resolution sub-picture tracks may be received for the current viewport compared to the quality or resolution covering the remaining 360-degree video.

It needs to be understood that even though the tile track approach and extractor-driven approach are described in details, specifically in the context of HEVC, they apply to other codecs and similar concepts as tile tracks or extractors. Moreover, a combination or a mixture of tile track and extractor-driven approach is possible. For example, such a mixture could be based on the tile track approach, but where a tile base track could contain guidance for rewriting operations for the client, e.g. the tile base track could include rewritten slice or tile group headers.

As an alternative to MCTS-based content encoding, content authoring for tile-based viewport-dependent streaming may be realized with sub-picture-based content authoring, described as follows. The pre-processing (prior to encoding) comprises partitioning uncompressed pictures to sub-pictures. Several sub-picture bitstreams of the same uncompressed sub-picture sequence are encoded, e.g. at the same resolution but different qualities and bitrates. The encoding may be constrained in a manner that merging of coded sub-picture bitstream to a compliant bitstream representing omnidirectional video is enabled. For example, dependencies on samples outside the decoded picture boundaries may be avoided in the encoding by selecting motion vectors in a manner that sample locations outside the picture would not be referred in the inter prediction process. Each sub-picture bitstream may be encapsulated as a sub-picture track, and one or more extractor tracks merging the sub-picture tracks of different sub-picture locations may be additionally formed. If a tile track based approach is targeted, each sub-picture bitstream is modified to become an MCTS sequence and stored as a tile track in a file, and one or more tile base tracks are created for the tile tracks.

Tile-based viewport-dependent streaming approaches may be realized by executing a single decoder instance or one decoder instance per MCTS sequence (or in some cases, something in between, e.g. one decoder instance per MCTSs of the same resolution), e.g. depending on the capability of the device and operating system where the player runs. The use of single decoder instance may be enabled by late binding or early binding. To facilitate multiple decoder instances, the extractor-driven approach may use sub-picture tracks that are compliant with the coding format or standard without modifications. Other approaches may need either to rewrite image segment headers, parameter sets, and/or alike information in the client side to construct a conforming bitstream or to have a decoder implementation capable of decoding an MCTS sequence without the presence of other coded video data.

There may be at least two approaches for encapsulating and referencing tile tracks or sub-picture tracks in the tile track approach and the extractor-driven approach, respectively:

Referencing track identifiers from a tile base track or an extractor track.

For the tile track approach, tile tracks and the tile base track of each bitstream may be encapsulated in an own file, and the same track identifiers are used in all files (e.g. representing different bitrate versions of the same content). In other words, the same track identifier value is used for each tile track of the same tile grid position in all these files. Thus, the tile base track is identical in all files, and the any one of the collocated tile tracks may be received.

For the extractor-driven approach, each of the sub-picture tracks of the same content at the same resolution but different bitrate may be encapsulated in an own file, and the same track identifiers may be used in all files (e.g. representing different bitrate versions of the same content); thus, track references from the extractor track resolve correctly to any bitrate versions of the received sub-picture tracks.

Referencing tile group identifiers from a tile base track or an extractor track. Several files are required in the track-identifier-based referencing described above, which may make its usage e.g. for file playback somewhat cumbersome. An option would be to store all tile or sub-picture tracks into the same file with different track identifiers, but then a separate tile base track or extractor track may be needed for each combination of tile or sub-picture tracks, respectively, that forms a conforming bitstream. To avoid creating an excessive number of tile base tracks or extractor tracks (e.g., to avoid creating an extractor track for each combination of high-resolution and low-resolution tiles), tracks that are alternatives for extraction may be grouped with a mechanism described in the following. Likewise, to enable the use of the same tile base track for collocated tile tracks representing different bitrate versions of the same content, the following mechanism may be used.

A file writer indicates in a file that a track group, e.g. referred to as 'alte' track group, contains tracks that are alternatives to be used as a source for extraction.

The identifier for the 'alte' group may be taken from the same numbering space as the identifier for tracks. In other words, the identifier for the 'alte' group may be required to differ from all the track identifier values. Consequently, the 'alte' track group identifier may be used in places where track identifier is conventionally used. Specifically, the 'alte' track group identifier may be used as a track reference indicating the source for extraction.

Members of the track group formed by this box are alternatives to be used as a source for extraction. Members of the track group with track_group_type equal to 'alte' are alternatives to be used as a source for 'scal' or 'sabt' track reference. A TrackReferenceTypeBox of reference_type equal to track_ref_4cc may list the track_group_id value(s) of an 'alte' track group(s) of containing the same alte_track_ref_4cc value in addition to or instead of track ID values. For example, an extractor track may, through a 'scal' track reference, point to an 'alte' track group in addition to or instead of individual tracks. Any single track of the 'alte' track group is a suitable source for extraction. A player or a file reader or alike may change the source track for extraction at a position where the track switched to has a sync sample or a SAP sample of type 1 or 2.

In the RWMQ method, one extractor track per each picture size and each tile grid is sufficient. In 360°+viewport video and RWMR video, one extractor track may be needed for each distinct viewing orientation.

During a streaming session, the user may pause the playback at any time. When the playback is paused, the user may look around and go outside the viewport that was valid at the time of pausing. When such a case takes place in viewport-dependent streaming, the out-of-viewport regions will be in lower quality/resolution. This phenomenon considerably degrades the user experience. Although there is enough bandwidth and time to display all 360-degree sphere in high quality while in pause state, there is no signaling mechanism to efficiently retrieve/decode/playback the current 360-degree sphere frame instance in high quality/resolution. Moreover, a complete 360-degree picture in high resolution might exceed the decoding capability. For example, the display resolution might be suitable for viewports originating from a 6K ERP resolution, while decoding capacity might be only up to 4K.

Moreover, if the playback system has a single decoder instance, even if the player somehow retrieves and decodes coded tiles or alike for the full 360-degree sphere corresponding to the paused time instance, the decoder's internal state is now completely different than at the pre-pause state. If the viewer starts playback again, the player needs to re-decode the previous coded picture content starting from a previous random-access position (e.g. of the last video segment) again in order to re-establish its decoder state. This produces unnecessary decoding operations, and may even cause unexpected delays before the start of the playback.

OMAF v2 also provides a relational mechanism for defining different omnidirectional content sources, which are called viewpoints. Assuming that time-wise long media (sub)segments are preferred for storage and encoding efficiency purposes, when a user switches from one viewpoint to another, there is a wasted bandwidth since the player would need to download a full media segment before performing the switching operation to the new viewpoint content.

Now an improved method for content retrieval during playback pause of a decoder is introduced in order to at least alleviate the above problems.

Figure 10:
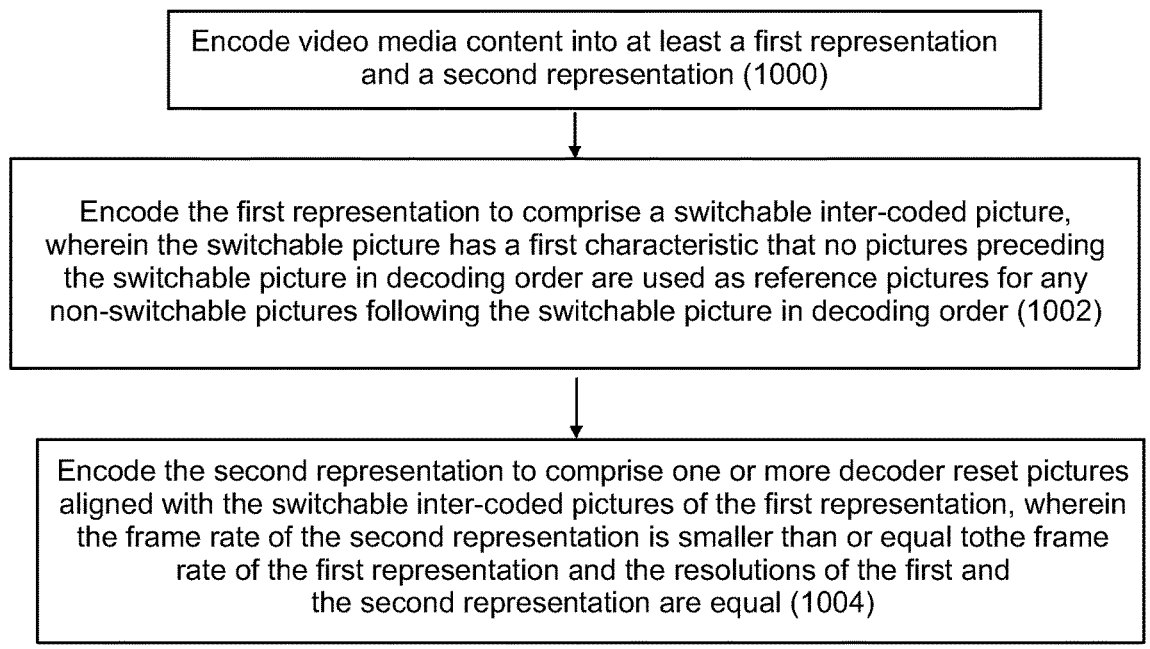
FIG. 10 shows a flow chart of an encoding method according to an embodiment of the invention.

The method according to an aspect, as shown in FIG. 10, comprises encoding (1000) video media content into at least a first representation and a second representation, wherein the first representation is encoded (1002) to comprise one or more switchable inter-coded pictures, wherein switchable inter-coded pictures have a first characteristic that no pictures preceding the switchable inter-coded picture in decoding order are used as reference pictures for any non-switchable pictures following the switchable inter-coded picture in decoding order; and the second representation is encoded (1004) to comprise one or more decoder reset pictures aligned with the switchable inter-coded pictures of the first representation, wherein the frame rate of the second representation is smaller than or equal to the frame rate of the first representation and the resolutions of the first and the second representation are equal.

In the embodiments, the term representation may be used interchangeably with the term bitstream or may be considered as an encapsulation of a bitstream for delivery and/or storage.

According to an embodiment, the switchable picture may have a second characteristic that the switchable picture is predicted only from zero or more previous switchable inter-coded pictures and/or from a previous random access picture in decoding order.

According to an embodiment, it is pre-defined e.g. in a coding standard and/or indicated in or along a bitstream (e.g. by an encoder) and/or decoded from or along a bitstream (e.g. by a decoder) that a switchable inter-coded picture has a second characteristic that the switchable inter-coded picture is predicted only from the previous switchable inter-coded pictures and/or from the previous random-access picture in decoding order, whichever is later in decoding order. The second characteristic makes it possible to replace a switchable inter-coded picture with a decoder reset picture and decode the first representation starting from the decoder reset picture.

According to an embodiment, it is pre-defined e.g. in a coding standard and/or indicated in or along a bitstream (e.g. by an encoder) and/or decoded from or along a bitstream (e.g. by a decoder) that a switchable inter-coded picture has a second characteristic that the switchable inter-coded picture is predicted only from zero or more previous pictures, in decoding order, at or subsequent to the previous switchable inter-coded picture or the previous random-access picture, whichever is later in decoding order. The second characteristic makes it possible to replace a switchable inter-coded picture with a decoder reset picture and decode the first representation starting from the decoder reset picture.

According to an embodiment, it is pre-defined e.g. in a coding standard and/or indicated in or along a bitstream (e.g. by an encoder) and/or decoded from or along a bitstream (e.g. by a decoder) that a switchable inter-coded picture has a second characteristic that the switchable inter-coded picture is predicted only from zero or more previous switchable inter-coded pictures and/or from the previous random-access picture in decoding order. The second characteristic makes it possible to decode the first representation by replacing switchable inter-coded pictures with corresponding decoder reset pictures, wherein the replacement is carried out for at least those switchable inter-coded pictures for which one or more of the reference pictures have not been decoded.

Thus, a novel video encoding method is introduced, providing multiple encoded representations of the same content with certain encoder constraints, such as the introduction of the switchable inter-coded pictures in the first representation and the decoder reset pictures in the second representation. Aligning the decoder reset pictures with switchable pictures may comprise, in many coding systems, indicating the same picture order count (POC) or the same least significant bits for POC, for them such that either of them can be referenced interchangeably in inter prediction from subsequent pictures in decoding order.

According to an embodiment, it is pre-defined e.g. in a coding standard and/or indicated in or along a bitstream (e.g. by an encoder) and/or decoded from or along a bitstream (e.g. by a decoder) that a switchable inter-coded picture has a third characteristic that all pictures preceding, in decoding order, the switchable inter-coded picture precede, in output order, all pictures succeeding, in decoding order, the switchable inter-coded picture. The third characteristic implies that a "full" achievable picture rate is achieved without picture freezing or stuttering when decoding is started from the decoder reset picture corresponding to the switchable inter-coded picture.

According to an embodiment, it is pre-defined e.g. in a coding standard and/or indicated in or along a bitstream (e.g. by an encoder) and/or decoded from or along a bitstream (e.g. by a decoder) that a switchable inter-coded picture has a third characteristic that both the switchable inter-coded picture itself and all pictures preceding, in decoding order, the switchable inter-coded picture precede, in output order, all pictures succeeding, in decoding order, the switchable inter-coded picture. The third characteristic implies that a "full" achievable picture rate is achieved without picture freezing or stuttering and that the decoder reset picture is the first picture in output order, when decoding is started from the decoder reset picture corresponding to the switchable inter-coded picture.

According to an embodiment, an encoder indicates in or along a bitstream and/or a decoder decodes from or along a bitstream an indication that a picture is a switchable inter-coded picture. The indication may for example be but is not limited to a particular NAL unit type value and/or a particular SEI message. The particular NAL unit type value may for example indicate that the associate picture is a trailing picture and that the first characteristic and zero or more of the second and third characteristics, as described above, are obeyed in the bitstream.

According to an embodiment, an encoder indicates in or along a bitstream and/or a decoder decodes from or along a bitstream one or more indications indicative of one or more of the first, second, and third characteristics associated with a particular picture. The indication(s) may for example be contained within a particular SEI message.

According to an embodiment, the method further comprises coding the switchable inter-coded pictures periodically. For example, in hierarchical inter coding with nested temporal scalability, a key picture (i.e., the picture with TemporalId equal to 0) in each group of picture (GOP) can be encoded as a switchable picture.

According to an embodiment, the decoder reset picture is encoded as a random-access picture type. According to an embodiment, the decoder reset picture is encoded as a random-access picture type such that implies no leading pictures. In an embodiment, the decoder reset picture is a Broken Link Access (BLA) picture type having no leading pictures following the BLA picture or as an Independent Decoding Refresh (IDR) picture. For example, in HEVC, a decoder reset picture may be encoded as a Broken Link Access (BLA) picture with a nal_unit_type equal to BLA_N_LP, which indicates that no leading pictures follow the BLA picture in decoding order. In some video codec implementations, there may be other picture or NAL unit types which provide a similar functionality as described above. For example, in the encoding scheme according to the draft of H.266/VVC, a decoder reset picture may be encoded as an Independent Decoding Refresh (IDR) picture, which include picture order count and start a coded video sequence and hence suffice as decoder reset pictures.

According to an embodiment, the decoder reset picture is encoded as a random-access picture type that may or may not have leading pictures, which may or may not be decodable when starting the decoding from the decoder reset picture. In an embodiment, the encoding is constrained in a manner that no leading pictures are encoded for the decoder reset picture. In another embodiment, the encoding is constrained in a manner that no RASL pictures or alike are encoded for the decoder reset picture.

According to an embodiment, the decoder reset picture is encoded as an intra-coded picture but may have e.g. a trailing picture type (e.g. TRAIL picture of HEVC). The encoding is constrained similarly to have it constrained for random-access pictures, i.e. subsequent pictures in output order are encoded so that they can be correctly decoded without performing the decoding process of any pictures that precede the decoder reset picture in decoding order. In an embodiment, the encoding is constrained in a manner that no leading pictures are encoded for the decoder reset picture. In another embodiment, the encoding is constrained in a manner that no RASL pictures or alike are encoded for the decoder reset picture.

Figure 11:
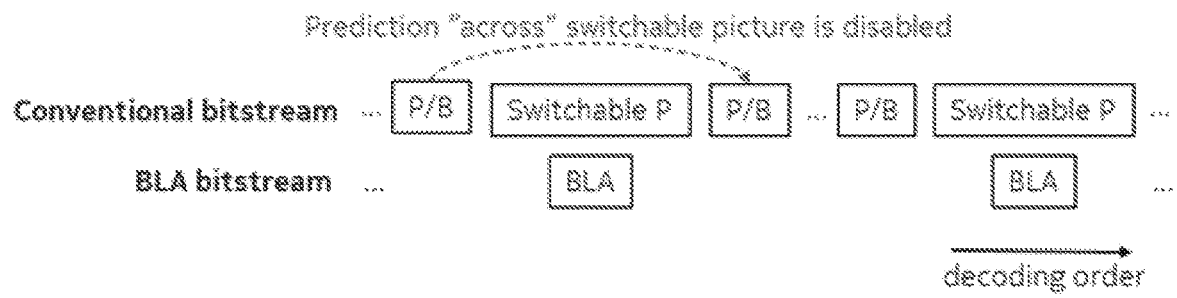
FIG. 11 shows an example of encoding constraints according to an embodiment of the invention.

FIG. 11 illustrates the encoding constraints and the relationships described above for the decoder reset pictures, especially in a case where the decoder reset pictures are BLA pictures. However, it needs to be understood that FIG. 11 can be similarly applied by replacing "BLA" with any other type(s) of decoder reset pictures or generally with the term decoder reset picture. In FIG. 11, the first representation is referred to as "conventional bitstream" and the second representation is referred to as "BLA bitstream". FIG. 11 shows how no pictures preceding the switchable inter-coded picture in decoding order are used as reference pictures for any non-switchable pictures following the switchable inter-coded picture in decoding order. In other words, prediction "across" a switchable picture is disabled. FIG. 11 also shows how the decoder reset pictures (BLA) of the second representation are aligned with the switchable pictures of the first representation. The frame rate of the second representation is equal to or smaller than that of the actual content frame rate used in the first representation, preferably an integer multiple of it. The pictures marked with "P/B" in FIG. 11 may be of any type. Such pictures may comprise e.g. uni-predicted (P), bi-predicted (B), or intra-predicted (I) coded image segments.

According to an embodiment, the method further comprises tuning coding parameters of the second representation in terms of improving picture quality when decoding a decoder reset picture of the second representation followed by pictures of the first representation.

Such coding parameter tuning may be achieved, for example through multi-pass encoding as follows:
After encoding a decoder reset picture, the decoder reset picture followed by pictures of the conventional bitstream (i.e. the first representation) are decoded.
Distortion metrics of the decoded pictures of the conventional bitstream are derived. For example, one or more of the following could be derived: average PSNR (over the pictures), picture-wise PSNR, peak sample-wise absolute difference.
If distortion metrics indicate a distortion below a predetermined limit, the parameters of the decoder reset picture may be determined to be sufficient.
Otherwise, the coding parameter decisions may be tuned. For example, a lower quantization parameter may be used, the lambda value for the rate-distortion optimization may be selected to favor fidelity more, and/or a higher bitrate target may be selected for the decoder reset picture (when rate control is in use). Then, the decoder reset picture is encoded again with the tuned coding parameter decisions.

When encoding a decoder reset picture, the input picture for encoding may be the same uncompressed picture that is also used in conventional encoding, but the distortion metrics may be derived relative to the decoded switchable picture from the conventional bitstream. Thus, the encoder attempts to minimize the distortion relative to the decoded switchable picture.

According to an embodiment, the method further comprises indicating, in or along the bitstream(s) and/or in metadata for representation(s) encapsulating the bitstream(s), suitability of the bitstreams or content of the representations for the switching between the bitstreams or the representations in decoding.

In an embodiment, it is indicated in or along the bitstream and/or in metadata for representation(s) encapsulating the bitstream(s) that
a unit of a second representation comprises a decoder reset picture;
a concatenated bitstream can be formed from the decoder reset picture followed by the pictures in a first representation that are subsequent to the switchable inter-coded picture corresponding to the decoder reset picture in decoding order; and
the concatenated bitstream is decodable and has satisfactory quality for displaying.

The unit of a second representation that comprises a decoder reset picture may e.g. be but is not limited to a Segment, a Subsegment, or a file format sample. The indication in or along the bitstream and/or the metadata may indicate which unit is in the scope of the indication, or it may be pre-defined or inferred which unit is in the scope. For example, it may be assumed that there is a single decoder reset picture per Subsegment and thus the indication may apply on Subsegment basis.

Thus, the encoder or an intermediate apparatus, such as a file generator or a server, provides the encoded first and second bitstreams in first and second representations, respectively, to be transmitted to a decoder or a player. The first and second representations can be transmitted e.g. in the ISO base media file format tracks or as DASH Representations.

If the ISO base media file format tracks are used, then a file-format-level signalling mechanism may be used, which indicates the suitability of the content for such a switching mechanism between tracks. For example, a track reference of a particular type (e.g., 'dren') from a track carrying the picture-switching-enabled bitstream (i.e. the second representation) to the track(s) carrying conventional bitstream(s) (i.e. the first representation) may be used. In another example, a track group of a particular type that contains a track carrying the picture-switching-enabled bitstream (i.e. the second representation) to the track(s) carrying conventional bitstream(s) (i.e. the first representation) may be used. A track may be indicated to carry the picture-switching-enabled bitstream e.g. by including a track-level indication, e.g. as a specific box in the sample entry of the track.

If DASH Representations are used, then a system-level DASH signalling mechanism may be used, which indicates the suitability of the content for such a switching mechanism between representations. For this purpose, a DASH protocol based mechanism may be provided as follows:
A new attribute in DASH MPD for the picture-switching-enabled representation (i.e. the second representation) is defined in order to indicate that said second representation can be used to replace the low quality tile Representation pictures e.g. in a pause state, and enable a decoder reset to continue decoding of the conventional representation (i.e. the first representation).

The attribute may be called e.g. as @decoderResetEnable, and it may be defined as follows:

@decoderResetEnable:
   a whitespace-separated list of values of Representation@id attributes specifying the conventional Representations for which this Representation provides the resetting pictures. The pictures are encoded as defined in this invention (in "Content Encoding" section) and a single decoder instance can be utilized.

It is noted that in the above signalling, @decoderResetEnable attribute is given as an example and DASH protocol is selected as an example. Any other name or protocol which fulfils the system level signalling and indicating the content encoding method suitability could be utilized.

Figure 12:
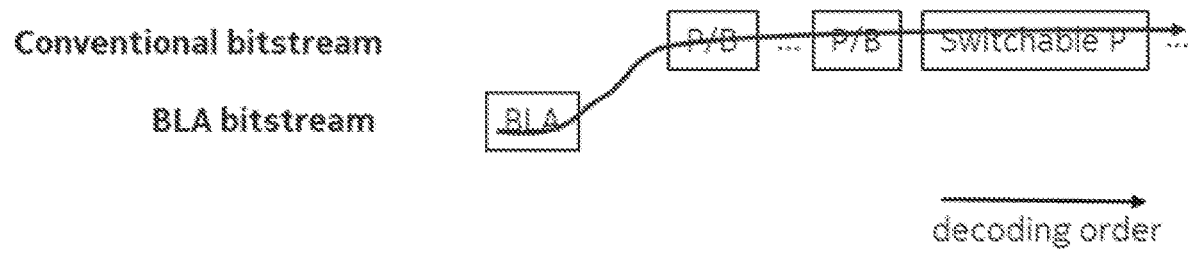
FIG. 12 shows an example of signaling a switch point between representations to an embodiment of the invention.

FIG. 12 illustrates the use of the @decoderResetEnable attribute or any equivalent indication. FIG. 12 uses the terminology of FIG. 11, but applies to other terminology similarly, as explained in the description of FIG. 11. @decoderResetEnable attribute indicates that the concatenated sequence of coded pictures, as shown by the arrow, can be decoded, and the decoding results in appropriate picture quality. Thus, a DASH signalling mechanism is defined so that media servers could signal the suitability of the encoded representations for such representation switching operations, for example but not limited to, during pause state as well as transition to play state. During the pause state decoder reset picture(s), i.e. BLA picture(s) in FIG. 12, may be decoded. When resuming the playback, @decoderResetEnable or any equivalent indication indicates to the player that the decoding can continue from the picture in the conventional bitstream following the switchable inter-coded picture corresponding to the decoder reset picture.

In the above, the file format and DASH signalling mechanisms have been defined as indications from a picture-switching-enabled track or representation to conventional track(s) or representation(s), respectively. It needs to be understood that embodiments could be similarly realized with references of the opposite direction, i.e. from a conventional track or representation to a picture-switching-enabled track or representation, respectively.

Another aspect relates to the operation of a player upon receiving at least the first bitstream or representation and an indication about the suitability of the content for the switching between the first representation and a second representation.

The operation may include, as shown in FIG. 13, receiving (1300) at least one bitstream corresponding to a first representation of encoded video media content, the first representation comprising one or more switchable inter-coded pictures, wherein switchable inter-coded pictures have a first characteristic that no pictures preceding the switchable picture in decoding order are used as reference pictures for any non-switchable pictures following the switchable picture in decoding order; receiving (1302), from or along the at least one bitstream, an indication about suitability of switching between the first representation and a second representation in decoding, wherein the second representation comprises one or more decoder reset pictures aligned with the switchable inter-coded pictures of the first representation, wherein the frame rate of the second representation is equal or smaller than the frame rate of the first representation and the resolutions of the first and the second representation are equal; receiving (1304) at least one decoder reset picture of the second representation; and decoding (1306) at least one decoder reset pictures of the second representation followed by pictures of the first representation.

According to an embodiment, the method further comprises requesting, in response to a pause in a playback of the decoded first representation, the at least one decoder reset picture of the second representation. The requesting may comprise e.g. issuing an HTTP GET request for a (Sub) segment that comprises the at least one decoder reset picture of the second representation.

Thus, when the playback is paused, e.g. by a command from a user of the playback device, the player requests the time-wise corresponding decoder reset pictures as signaled in the indication, such as in the DASH MPD, decodes the decoder reset pictures and updates the 360-degree sphere with the decoded high quality decoder reset pictures.

Since decoder reset pictures reset the decoder (as each of them start a new coded video sequence), they can be decoded with the same decoder instance without causing problems regarding e.g. decoder resources and buffers. By receiving the indication about the suitability of the content of the representations for switching between the first representation and the second representation in decoding, the player can successfully enable high quality 360-degree video picture display during pause state and also start playback without substantial impact on decoder resources and buffers.

According to an embodiment, the method further comprises decoding, in response to a re-start of the playback, a decoder reset picture substantially timely corresponding to the re-start; and switching to decode pictures of the first representation following, in decoding order, a switchable inter-coded picture of the first representation, which is temporarily aligned with the decoder reset picture substantially timely corresponding to the re-start.

When the playback re-starts, the player decodes a decoder reset picture substantially timely corresponding to the re-start. The decoder reset picture may be the next decoder reset picture timely following the playback re-start. On the other hand, if the previous decoded decoder reset picture is temporarily close enough to the playback re-start, it may also be used as a switch point to the first representation. The player then continues decoding the conventional Representation (the first representation) from the picture that follows a switchable picture that is temporarily aligned with the decoder reset picture used as the switch point.

Embodiments have been described above in relation to a first representation and a second representation. Embodiments apply similarly for a first set of representations, each like the first representation, and a second set of representations, each like the second representation and each having a corresponding representation among the first set of representations. Embodiments can be applied pairwise to a selected representation among the first set of representations and the corresponding representation among the second set of representations. For example, embodiments apply when multiple tile tracks, sub-picture tracks, or alike are received e.g. to achieve viewport-dependent streaming as described earlier.

According to an embodiment, the method further comprises requesting, in response to a pause in a playback of the decoded first representation, a plurality of decoder reset pictures of the second representation according to constraints of decoder buffer size and/or available bandwidth.

According to an embodiment, the method further comprises requesting, in response to a pause in a playback of the decoded first set of representations, a plurality of decoder reset pictures from the second set of second representations according to constraints of decoder buffer size and/or available bandwidth. For example, decoder reset pictures covering a current viewport may be requested from the second set of representations carrying tile or sub-picture tracks or alike.

Thus, the player may take advantage of the pause time duration by fetching, during the pause state, the high quality tiles covering the entire content coverage (e.g. 360 degrees) based on its available buffer size or based on the defined bandwidth utilization policy. The high quality tiles may be included in the second set of representations. The high quality tiles may e.g. be random-access pictures in sub-picture tracks encapsulated in the second set of representations, or may e.g. be tiles or tile sets of random-access pictures enclosed in tile tracks encapsulated in the second set of representations. The player may first decode and play back the high quality pre-fetched tiles, and when resuming to the normal playback operation with a specific viewport, the player starts to request the high quality content for the viewport and low quality for the rest of the 360-degree sphere based on the viewport.

During the pause state, the player may also start prefetching with the following policies:

Prefetch first the high quality tiles for the current viewport, and then for an enlarged area, which may be defined by a threshold, around the paused viewport.

"Slow Prefetch" of the viewports corresponding to the HMD/gaze orientation or in a "landing orientation" e.g. after a casual motion during the pause state. This allows to track the motion of the user and prefetch data at low speed, since it may be expected that he/she will start playback from the landing orientation point.

According to an embodiment, the method further comprises requesting, in response to a viewport switch, at least one decoder reset picture of the second representation. The requesting may comprise e.g. issuing an HTTP GET request for a (Sub)segment that comprises the at least one decoder reset picture of the second representation.

According to an embodiment, the method further comprises applying the switching from the first representation to the second representation upon switching from a first viewport to a second viewport. Thus, the above-mentioned signalling, such as the DASH signalling mechanism, and the player operation can be applied when the player switches from one viewport to another viewport. A decoder reset picture would enable a fast transition from one media (sub)segment of a viewport to another media (sub)segment of another viewport, hence enabling a low latency and efficient bandwidth utilization during the viewport switching process. This embodiment may enable for example using of a relatively large random-access picture interval in the first representation to achieve better compression performance, while a fast response to viewing orientation switches in viewport-dependent streaming can be achieved by providing the second representation with relatively frequent decoder reset pictures. When switching to another viewport, the decoder reset picture(s) covering that viewport are received and decoded first, followed by the pictures(s) of the first (set of) representation(s) that follow the decoder reset picture(s) in decoding order.

According to an embodiment, the method further comprises requesting, in response to a viewport switch, at least one decoder reset picture of the second representation. The requesting may comprise e.g. issuing an HTTP GET request for a (Sub)segment that comprises the at least one decoder reset picture of the second representation of the destination viewpoint (being switched to). A player may issue another request covering coded pictures of the first representation of the destination viewpoint, subsequent to the switchable inter-coded picture that corresponds to the decoder reset picture.

According to an embodiment, the method further comprises applying the switching from the first representation to the second representation upon switching from a first viewpoint to a second viewpoint. Thus, the above-mentioned signalling, such as the DASH signalling mechanism, and the player operation can be applied when the player switches from one viewpoint to another viewpoint. A decoder reset picture would enable a fast transition from one media segment of a viewpoint to another media segment of another viewpoint, hence enabling a low latency and efficient bandwidth utilization during the viewpoint switching process.

The embodiments may be combined with extractors e.g. as defined for HEVC in ISO/IEC 14496-15 with the constraint that extractors do not necessarily enable mixing image segments (e.g. slices) of switchable and reset pictures, since image segment headers (e.g. slice headers) of said picture types differ from each other. The signaling according to the embodiments may be indicated between a pair of extractor tracks/Representations, conventional and reset-picture ones, which extract from conventional and reset-picture sub-picture tracks/Representations, respectively.

Some video coding formats or standards may allow mixing of image segments originating from switchable pictures and reset pictures. In such a case, each set of collocating tile tracks, sub-picture tracks, or alike originating from the first set of representations and the second set of representations may be indicated to be alternatives for each other, e.g. using the 'alte' track group as described above. An extractor track can refer to the track group(s) of collocated image segments from the first and second set of representations. A player may select on image segment basis (e.g. sub-picture or tile basis) whether the image segment originates from a switchable inter-coded picture or the corresponding decoder reset picture According to an embodiment, a network based media processing entity may generate decoder reset pictures substantially instantaneously (i.e. on the fly) during the streaming session and enable seamless switching between different Representations. Such an entity may be compliant with MPEG NBMP or a similar standard. In such a case DASH @decoderResetEnable flag may indicate the presence of such decoder reset pictures in the representation. The embodiments may provide significant advantages. For example, the player can successfully utilize the described embodiments and enable high quality 360-degree video picture display during the pause state and also start the playback with minimal impact on decoder resources and buffers. A single decoder instance may be sufficient to realize the described embodiments, whereupon no additional decoder constraints are set on the player side, except the capability to interpret the signalling, such as to parse and interpret the @decoderResetEnable DASH attribute. With the appropriate signaling, such as the @decoderResetEnable, the player can understand that the associated representation is suitable for resetting the decoding for starting decoding of an indicated conventional Representation at a non-stream-access-point position. Moreover, the embodiments provide a better user experience when an omnidirectional video playback is paused and then resumed. Also the network resources are better utilized by eliminating unnecessary media data transfers for decoder state alignment.

Figure 14:
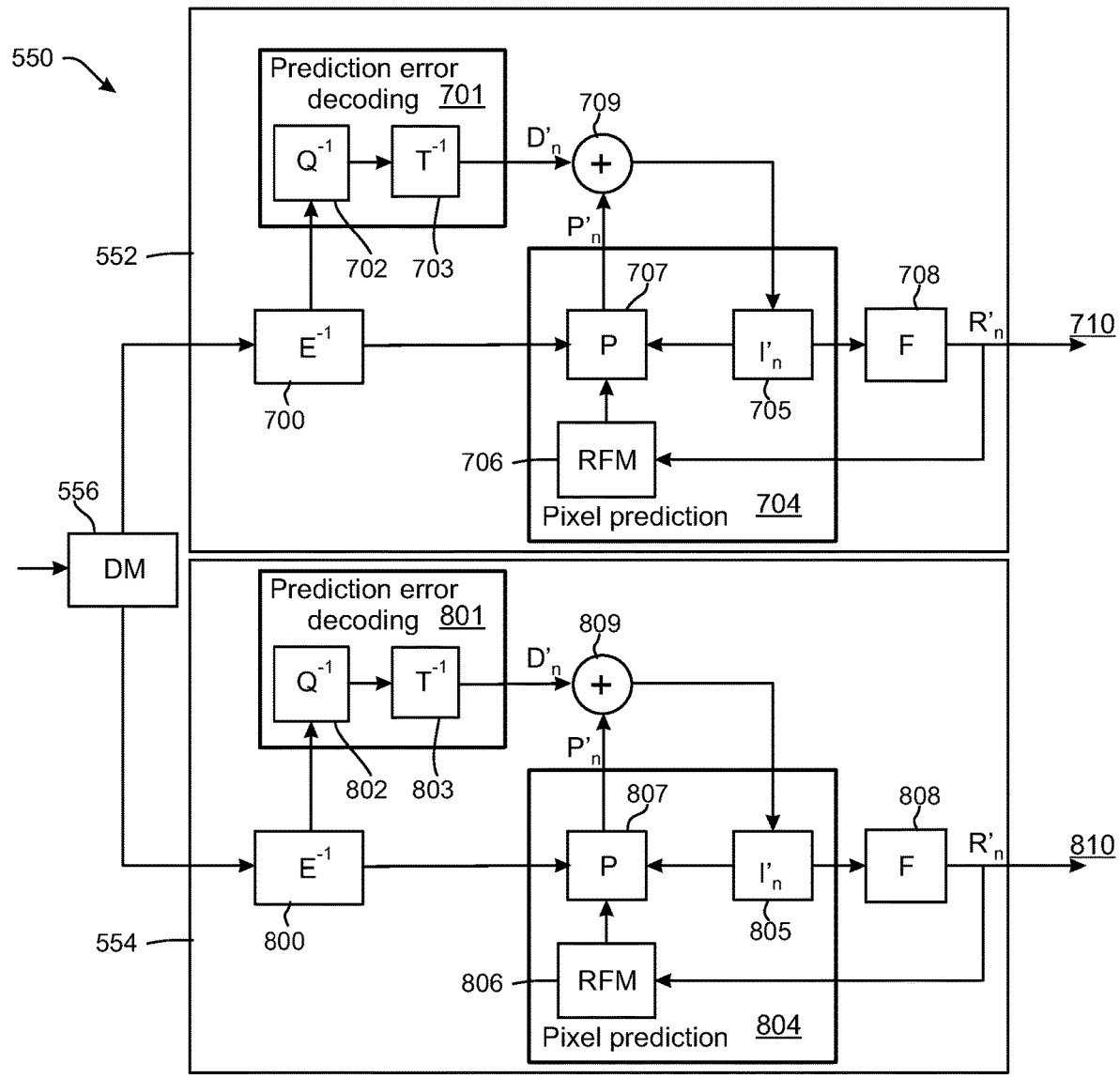
FIG. 14 shows a schematic diagram of a decoder suitable for implementing embodiments of the invention.

FIG. 14 shows a block diagram of a video decoder suitable for employing embodiments of the invention. FIG.

14 depicts a structure of a two-layer decoder, but it would be appreciated that the decoding operations may similarly be employed in a single-layer decoder.

The video decoder 550 comprises a first decoder section 552 for a base layer and a second decoder section 554 a predicted layer. Block 556 illustrates a demultiplexer for delivering information regarding base layer pictures to the first decoder section 552 and for delivering information regarding predicted layer pictures to the second decoder section 554. Reference P'n stands for a predicted representation of an image block. Reference D'n stands for a reconstructed prediction error signal. Blocks 704, 804 illustrate preliminary reconstructed images (I'n). Reference R'n stands for a final reconstructed image. Blocks 703, 803 illustrate inverse transform ($T^{-1}$). Blocks 702, 802 illustrate inverse quantization ($Q^{-1}$). Blocks 701, 801 illustrate entropy decoding ($E^{-1}$). Blocks 705, 805 illustrate a reference frame memory (RFM). Blocks 706, 806 illustrate prediction (P) (either inter prediction or intra prediction). Blocks 707, 807 illustrate filtering (F). Blocks 708, 808 may be used to combine decoded prediction error information with predicted base layer/predicted layer images to obtain the preliminary reconstructed images (I'n). Preliminary reconstructed and filtered base layer images may be output 709 from the first decoder section 552 and preliminary reconstructed and filtered base layer images may be output 809 from the first decoder section 554.

Herein, the decoder should be interpreted to cover any operational unit capable to carry out the decoding operations, such as a player, a receiver, a gateway, a demultiplexer and/or a decoder.

Figure 15:
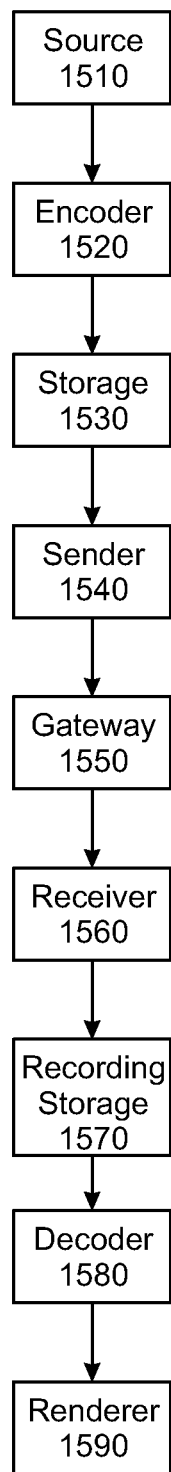
FIG. 15 shows a schematic diagram of an example multimedia communication system within which various embodiments may be implemented.

FIG. 15 is a graphical representation of an example multimedia communication system within which various embodiments may be implemented. A data source 1510 provides a source signal in an analog, uncompressed digital, or compressed digital format, or any combination of these formats. An encoder 1520 may include or be connected with a pre-processing, such as data format conversion and/or filtering of the source signal. The encoder 1520 encodes the source signal into a coded media bitstream. It should be noted that a bitstream to be decoded may be received directly or indirectly from a remote device located within virtually any type of network. Additionally, the bitstream may be received from local hardware or software. The encoder 1520 may be capable of encoding more than one media type, such as audio and video, or more than one encoder 1520 may be required to code different media types of the source signal. The encoder 1520 may also get synthetically produced input, such as graphics and text, or it may be capable of producing coded bitstreams of synthetic media. In the following, only processing of one coded media bitstream of one media type is considered to simplify the description. It should be noted, however, that typically real-time broadcast services comprise several streams (typically at least one audio, video and text sub-titling stream). It should also be noted that the system may include many encoders, but in the figure only one encoder 1520 is represented to simplify the description without a lack of generality. It should be further understood that, although text and examples contained herein may specifically describe an encoding process, one skilled in the art would understand that the same concepts and principles also apply to the corresponding decoding process and vice versa.

The coded media bitstream may be transferred to a storage 1530. The storage 1530 may comprise any type of mass memory to store the coded media bitstream. The format of the coded media bitstream in the storage 1530 may be an elementary self-contained bitstream format, or one or more coded media bitstreams may be encapsulated into a container file, or the coded media bitstream may be encapsulated into a Segment format suitable for DASH (or a similar streaming system) and stored as a sequence of Segments. If one or more media bitstreams are encapsulated in a container file, a file generator (not shown in the figure) may be used to store the one more media bitstreams in the file and create file format metadata, which may also be stored in the file. The encoder 1520 or the storage 1530 may comprise the file generator, or the file generator is operationally attached to either the encoder 1520 or the storage 1530. Some systems operate "live", i.e. omit storage and transfer coded media bitstream from the encoder 1520 directly to the sender 1540. The coded media bitstream may then be transferred to the sender 1540, also referred to as the server, on a need basis. The format used in the transmission may be an elementary self-contained bitstream format, a packet stream format, a Segment format suitable for DASH (or a similar streaming system), or one or more coded media bitstreams may be encapsulated into a container file. The encoder 1520, the storage 1530, and the server 1540 may reside in the same physical device or they may be included in separate devices. The encoder 1520 and server 1540 may operate with live real-time content, in which case the coded media bitstream is typically not stored permanently, but rather buffered for small periods of time in the content encoder 1520 and/or in the server 1540 to smooth out variations in processing delay, transfer delay, and coded media bitrate.

The server 1540 sends the coded media bitstream using a communication protocol stack. The stack may include but is not limited to one or more of Real-Time Transport Protocol (RTP), User Datagram Protocol (UDP), Hypertext Transfer Protocol (HTTP), Transmission Control Protocol (TCP), and Internet Protocol (IP). When the communication protocol stack is packet-oriented, the server 1540 encapsulates the coded media bitstream into packets. For example, when RTP is used, the server 1540 encapsulates the coded media bitstream into RTP packets according to an RTP payload format. Typically, each media type has a dedicated RTP payload format. It should be again noted that a system may contain more than one server 1540, but for the sake of simplicity, the following description only considers one server 1540.

If the media content is encapsulated in a container file for the storage 1530 or for inputting the data to the sender 1540, the sender 1540 may comprise or be operationally attached to a "sending file parser" (not shown in the figure). In particular, if the container file is not transmitted as such but at least one of the contained coded media bitstream is encapsulated for transport over a communication protocol, a sending file parser locates appropriate parts of the coded media bitstream to be conveyed over the communication protocol. The sending file parser may also help in creating the correct format for the communication protocol, such as packet headers and payloads. The multimedia container file may contain encapsulation instructions, such as hint tracks in the ISOBMFF, for encapsulation of the at least one of the contained media bitstream on the communication protocol.

The server 1540 may or may not be connected to a gateway 1550 through a communication network, which may e.g. be a combination of a CDN, the Internet and/or one or more access networks. The gateway may also or alternatively be referred to as a middle-box. For DASH, the gateway may be an edge server (of a CDN) or a web proxy. It is noted that the system may generally comprise any number gateways or alike, but for the sake of simplicity, the following description only considers one gateway 1550. The gateway 1550 may perform different types of functions, such as translation of a packet stream according to one communication protocol stack to another communication protocol stack, merging and forking of data streams, and manipulation of data stream according to the downlink and/or receiver capabilities, such as controlling the bit rate of the forwarded stream according to prevailing downlink network conditions. The gateway 1550 may be a server entity in various embodiments.

The system includes one or more receivers 1560, typically capable of receiving, de-modulating, and de-capsulating the transmitted signal into a coded media bitstream. The coded media bitstream may be transferred to a recording storage 1570. The recording storage 1570 may comprise any type of mass memory to store the coded media bitstream. The recording storage 1570 may alternatively or additively comprise computation memory, such as random access memory. The format of the coded media bitstream in the recording storage 1570 may be an elementary self-contained bitstream format, or one or more coded media bitstreams may be encapsulated into a container file. If there are multiple coded media bitstreams, such as an audio stream and a video stream, associated with each other, a container file is typically used and the receiver 1560 comprises or is attached to a container file generator producing a container file from input streams. Some systems operate "live," i.e. omit the recording storage 1570 and transfer coded media bitstream from the receiver 1560 directly to the decoder 1580. In some systems, only the most recent part of the recorded stream, e.g., the most recent 10-minute excerption of the recorded stream, is maintained in the recording storage 1570, while any earlier recorded data is discarded from the recording storage 1570.

The coded media bitstream may be transferred from the recording storage 1570 to the decoder 1580. If there are many coded media bitstreams, such as an audio stream and a video stream, associated with each other and encapsulated into a container file or a single media bitstream is encapsulated in a container file e.g. for easier access, a file parser (not shown in the figure) is used to decapsulate each coded media bitstream from the container file. The recording storage 1570 or a decoder 1580 may comprise the file parser, or the file parser is attached to either recording storage 1570 or the decoder 1580. It should also be noted that the system may include many decoders, but here only one decoder 1570 is discussed to simplify the description without a lack of generality The coded media bitstream may be processed further by a decoder 1570, whose output is one or more uncompressed media streams. Finally, a renderer 1590 may reproduce the uncompressed media streams with a loudspeaker or a display, for example. The receiver 1560, recording storage 1570, decoder 1570, and renderer 1590 may reside in the same physical device or they may be included in separate devices.

A sender 1540 and/or a gateway 1550 may be configured to perform switching between different representations e.g. for switching between different viewports of 360-degree video content, view switching, bitrate adaptation and/or fast start-up, and/or a sender 1540 and/or a gateway 1550 may be configured to select the transmitted representation(s). Switching between different representations may take place for multiple reasons, such as to respond to requests of the receiver 1560 or prevailing conditions, such as throughput, of the network over which the bitstream is conveyed. In other words, the receiver 1560 may initiate switching between representations. A request from the receiver can be, e.g., a request for a Segment or a Subsegment from a different representation than earlier, a request for a change of transmitted scalability layers and/or sub-layers, or a change of a rendering device having different capabilities compared to the previous one. A request for a Segment may be an HTTP GET request. A request for a Subsegment may be an HTTP GET request with a byte range. Additionally or alternatively, bitrate adjustment or bitrate adaptation may be used for example for providing so-called fast start-up in streaming services, where the bitrate of the transmitted stream is lower than the channel bitrate after starting or random-accessing the streaming in order to start playback immediately and to achieve a buffer occupancy level that tolerates occasional packet delays and/or retransmissions. Bitrate adaptation may include multiple representation or layer up-switching and representation or layer down-switching operations taking place in various orders.

A decoder 1580 may be configured to perform switching between different representations e.g. for switching between different viewports of 360-degree video content, viewpoint switching, bitrate adaptation and/or fast start-up, and/or a decoder 1580 may be configured to select the transmitted representation(s). Switching between different representations may take place for multiple reasons, such as to achieve faster decoding operation or to adapt the transmitted bitstream, e.g. in terms of bitrate, to prevailing conditions, such as throughput, of the network over which the bitstream is conveyed. Thus, the decoder may comprise means for requesting at least one decoder reset picture of the second representation for carrying out bitrate adaptation between the first representation and a third representation. Faster decoding operation might be needed for example if the device including the decoder 1580 is multi-tasking and uses computing resources for other purposes than decoding the video bitstream. In another example, faster decoding operation might be needed when content is played back at a faster pace than the normal playback speed, e.g. twice or three times faster than conventional real-time playback rate.

In the above, some embodiments have been described in relation to ISOBMFF, e.g. when it comes to segment format. It needs to be understood that embodiments could be similarly realized with any other file format, such as Matroska, with similar capability and/or structures as those in ISOBMFF.

In the above, where the example embodiments have been described with reference to an encoder, it needs to be understood that the resulting bitstream and the decoder may have corresponding elements in them. Likewise, where the example embodiments have been described with reference to a decoder, it needs to be understood that the encoder may have structure and/or computer program for generating the bitstream to be decoded by the decoder.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

Although the above examples describe embodiments of the invention operating within a codec within an electronic device, it would be appreciated that the invention as defined in the claims may be implemented as part of any video codec. Thus, for example, embodiments of the invention may be implemented in a video codec which may implement video coding over fixed or wired communication paths.

Thus, user equipment may comprise a video codec such as those described in embodiments of the invention above. It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

The invention claimed is:

1. A method comprising:
    encoding video media content into at least a first representation and a second representation, wherein:
        the first representation comprises a switchable inter-coded picture, wherein the switchable inter-coded picture comprises a first characteristic that no pictures preceding the switchable inter-coded picture in decoding order are used as reference pictures for non-switchable pictures following the switchable inter-coded picture in decoding order; and
        the second representation comprises one or more decoder reset pictures aligned with switchable inter-coded pictures of the first representation,
    wherein a frame rate of the second representation is smaller than or equal to a frame rate of the first representation and resolutions of the first and the second representations are equal or substantially equal,
    wherein the first representation and the second representation are encoded to enable decoding of a decoder reset picture of the second representation, followed by decoding of pictures of the first representation that are subsequent to a switchable inter-coded picture of the first representation that corresponds to the decoder reset picture, without the corresponding switchable inter-coded picture having been decoded.

2. An apparatus comprising at least one processor and at least one non-transitory memory including computer program code for one or more programs, the at least one memory and the computer program code configured to, with the at least one processor, cause the apparatus at least to:
    encode video media content into at least a first representation and a second representation, wherein:
        the first representation comprises a switchable inter-coded picture, wherein the switchable inter-coded picture comprises a first characteristic that no pictures preceding the switchable inter-coded picture in decoding order are used as reference pictures for non-switchable pictures following the switchable inter-coded picture in decoding order; and
        the second representation comprises one or more decoder reset pictures aligned with switchable inter-coded pictures of the first representation,
    wherein a frame rate of the second representation is smaller than or equal to a frame rate of the first representation and resolutions of the first and the second representations are equal or substantially equal,
    wherein the first representation and the second representation are encoded to enable decoding of a decoder reset picture of the second representation, followed by decoding of pictures of the first representation that are subsequent to a switchable inter-coded picture of the first representation that corresponds to the decoder reset picture, without the corresponding switchable inter-coded picture having been decoded.

3. The apparatus according to claim 2, wherein the switchable inter-coded picture comprises a second characteristic that the switchable inter-coded picture is predicted at least from zero or more previous switchable inter-coded pictures or from a previous random access picture in decoding order.

4. The apparatus according to claim 2, wherein the apparatus is further caused to indicate, in or along a bitstream corresponding to the first representation, suitability of content of the first and second representations for switching between the first representation and the second representation in decoding.

5. The apparatus according to claim 2, wherein the decoder reset picture is configured to be encoded as a broken link access picture type comprising no leading pictures following the broken link access picture or as an independent decoding refresh picture.

6. A method comprising:
receiving at least one bitstream corresponding to a first representation of encoded video media content, the first representation comprising a switchable inter-coded picture, wherein the switchable inter-coded picture comprises a first characteristic that no pictures preceding the switchable inter-coded picture in decoding order are used as reference pictures for non-switchable pictures following the switchable inter-coded picture in decoding order;
receiving, from or along the at least one bitstream, an indication about suitability of switching between the first representation and a second representation of the encoded video media content in decoding, wherein the second representation comprises one or more decoder reset pictures aligned with switchable inter-coded pictures of the first representation, wherein a frame rate of the second representation is smaller than or equal to a frame rate of the first representation and resolutions of the first and the second representations are equal or substantially equal;
receiving at least one decoder reset picture of the second representation; and
decoding the at least one decoder reset picture of the second representation, followed by decoding of pictures of the first representation that are subsequent to a switchable inter-coded picture of the first representation that corresponds to the at least one decoder reset picture, without the corresponding switchable inter-coded picture having been decoded.

7. An apparatus comprising at least one processor and at least one non-transitory memory including computer program code for one or more programs, the at least one memory and the computer program code configured to, with the at least one processor, cause the apparatus at least to:
receive at least one bitstream corresponding to a first representation of encoded video media content, the first representation comprising a switchable inter-coded picture, wherein the switchable inter-coded picture comprises a first characteristic that no pictures preceding the switchable inter-coded picture in decoding order are used as reference pictures for non-switchable pictures following the switchable inter-coded picture in decoding order;
receive, from or along the at least one bitstream, an indication about suitability of switching between the first representation and a second representation of the encoded video media content in decoding, wherein the second representation comprises one or more decoder reset pictures aligned with switchable inter-coded pictures of the first representation, wherein a frame rate of the second representation is smaller than or equal to a frame rate of the first representation and resolutions of the first and the second representations are equal or substantially equal;
receive at least one decoder reset picture of the second representation; and
decode at least one decoder reset picture of the second representation, followed by decoding of pictures of the first representation that are subsequent to a switchable inter-coded picture of the first representation that corresponds to the at least one decoder reset picture, without the corresponding switchable inter-coded picture having been decoded.

8. The apparatus according to claim 7, wherein the switchable inter-coded picture comprises a second characteristic that the switchable inter-coded picture is predicted at least from zero or more previous switchable inter-coded pictures or from a previous random access picture in decoding order.

9. The apparatus according to claim 7, wherein the apparatus is further caused to request, in response to a pause in a playback of the decoded first representation, the at least one decoder reset picture of the second representation.

10. The apparatus according to claim 7, wherein the apparatus is further caused to request, in response to a viewport switch, the at least one decoder reset picture of the second representation.

11. The apparatus according to claim 10, wherein the viewport switch takes place from a first viewport to a second viewport, and wherein the first representation covers the first viewport, and wherein the apparatus is further caused to receive a second bitstream corresponding to a third representation of the encoded video media content, the third representation representing the second viewport.

12. The apparatus according to claim 7, wherein the apparatus is further caused to request, in response to a viewpoint switch, the at least one decoder reset picture of the second representation.

13. The apparatus according to claim 12, wherein the viewpoint switch takes place from a first viewpoint to a second viewpoint, and wherein the first representation covers the first viewpoint, and wherein the apparatus is further caused to receive a second bitstream corresponding to a third representation of the encoded video media content, the third representation representing the second viewpoint.

14. The apparatus according to claim 7, wherein the apparatus is further caused to:
decode, in response to a re-start of a playback, a decoder reset picture substantially timely corresponding to the re-start; and
switch to decode pictures of the first representation following, in decoding order, a switchable inter-coded picture of the first representation, which is temporarily aligned with the decoder reset picture substantially timely corresponding to the re-start.

15. The apparatus according to claim 7, wherein the apparatus is further caused to:
request, in response to a pause in a playback of the decoded first representation, a plurality of decoder reset pictures of the second representation based on available bandwidth.

16. The apparatus according to claim 7, wherein the apparatus is further caused to:
   request the at least one decoder reset picture of the second representation for carrying out bitrate adaptation between the first representation and a third representation.

17. The apparatus according to claim 16, wherein a bitrate switch takes place from a first bitrate to a second bitrate, and wherein the first representation corresponds to the first bitrate, and wherein the apparatus is further caused to receive a second bitstream corresponding to the third representation of the encoded video media content, the third representation representing the second bitrate.

18. The apparatus according to claim 7, wherein the apparatus is further caused to:
   extract at least one switchable inter-coded picture from a first extractor track or representation; and
   extract the at least one decoder reset picture from a second extractor track or representation.

19. A computer program product comprises at least one non-transitory computer-readable storage medium having computer executable program code instructions stored therein, the computer executable program code instructions comprising program code instructions configured, upon execution, to:
   receive at least one bitstream corresponding to a first representation of encoded video media content, the first representation comprising a switchable inter-coded picture, wherein the switchable inter-coded picture comprises a first characteristic that no pictures preceding the switchable inter-coded picture in decoding order are used as reference pictures for non-switchable pictures following the switchable inter-coded picture in decoding order;
   receive, from or along the at least one bitstream, an indication about suitability of switching between the first representation and a second representation of the encoded video media content in decoding, wherein the second representation comprises one or more decoder reset pictures aligned with switchable inter-coded pictures of the first representation, wherein the frame rate of the second representation is smaller than or equal to a frame rate of the first representation and resolutions of the first and the second representation are equal or substantially equal;
   receive at least one decoder reset picture of the second representation; and
   decode the at least one decoder reset picture of the second representation, followed by decoding of pictures of the first representation that are subsequent to a switchable inter-coded picture of the first representation that corresponds to the at least one decoder reset picture, without the corresponding switchable inter-coded picture having been decoded.

* * * * *